United States Patent
Wang et al.

(10) Patent No.: US 12,543,138 B2
(45) Date of Patent: Feb. 3, 2026

(54) INFORMATION TRANSMISSION METHOD, LIGHTWEIGHT PROCESSING METHOD, AND RELATED COMMUNICATION APPARATUS

(71) Applicant: HUAWEI TECHNOLOGIES CO., LTD., Guangdong (CN)

(72) Inventors: Chujie Wang, Shanghai (CN); Dongrun Qin, Shenzhen (CN); Shuigen Yang, Shenzhen (CN); Wen Yan, Shanghai (CN); Xietian Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 475 days.

(21) Appl. No.: 18/308,086

(22) Filed: Apr. 27, 2023

(65) Prior Publication Data

US 2024/0080788 A1    Mar. 7, 2024

Related U.S. Application Data

(63) Continuation of application No. PCT/CN2020/125088, filed on Oct. 30, 2020.

(51) Int. Cl.
*H04W 28/06*    (2009.01)
*H04W 60/00*    (2009.01)

(52) U.S. Cl.
CPC .......... *H04W 60/00* (2013.01); *H04W 28/06* (2013.01)

(58) Field of Classification Search
None
See application file for complete search history.

(56) References Cited

U.S. PATENT DOCUMENTS

| | | | |
|---|---|---|---|
| 2019/0318245 A1* | 10/2019 | Song | G06F 9/5027 |
| 2022/0383078 A1* | 12/2022 | Hou | G06N 3/06 |
| 2023/0229912 A1* | 7/2023 | Zhang | G06N 3/0455 |
| | | | 706/25 |

OTHER PUBLICATIONS

Sun et al., "Adaptive Federated Learning With Gradient Compression in Uplink NOMA," arxiv.org, Cornell University Library, 201 Olin Library Cornell University Ithaca. NY 14853, Mar. 3, 2020 (Mar. 3, 2020); 10 total pages.

* cited by examiner

*Primary Examiner* — Idowu O Osifade
(74) *Attorney, Agent, or Firm* — Rimon PC

(57) ABSTRACT

This application provides a method and a related communication apparatus applicable to the communication field. In the method, a network device receives a first notification message sent by a terminal device, where the first notification message indicates that the terminal device has completed training on a target model, and the first notification message includes a model name corresponding to the target model. The network device then determines policy information based on the uplink channel state information of the terminal device; and sends a lightweight indication message to the terminal device.

20 Claims, 15 Drawing Sheets (A)

(B)

(C)

INFORMATION TRANSMISSION METHOD, LIGHTWEIGHT PROCESSING METHOD, AND RELATED COMMUNICATION APPARATUS

CROSS-REFERENCE TO RELATED APPLICATION

This application is a continuation of International Patent Application No. PCT/CN2020/125088, filed on Oct. 30, 2020, the disclosure of which is hereby incorporated by reference in its entirety.

TECHNICAL FIELD

Embodiments of this application relate to the communication field, and in particular, to an information transmission method, a lightweight processing method, and a related communication apparatus.

BACKGROUND

Federated learning is an encrypted distributed machine learning technology and can fully use data and computing capabilities of participants, so that multiple parties cooperatively build a common and robust machine learning model without sharing data. In an environment with increasingly strict data supervision, federated learning can resolve key problems such as data ownership, data privacy, data access right, and heterogeneous data access. In a wireless scenario, to ensure data security or reduce the amount of information transmission, a model may be trained through federated learning.

Currently, to reduce communication overheads after completing training on a local model, a user equipment (UE) selects, according to a rule from the lightweight methods supported by the user equipment, a lightweight method and a lightweight policy configuration to perform lightweight processing on the local model, and then uploads model parameter information. The selected lightweight method is a method that is directly applicable without restoring lightweight model parameter information.

However, when an uplink transmission rate is high, if the UE uses a lightweight method and a lightweight policy configuration that have a high compression ratio, model precision is greatly affected. As a result, precision after aggregation is reduced. Alternatively, when an uplink transmission rate is low, if the UE uses a lightweight method and a lightweight policy configuration that have a low compression ratio, an excessively large amount of model parameter information is transferred, which results in a waste of transmission resources and reduced transmission efficiency.

SUMMARY

Embodiments of this application provide an information transmission method, a lightweight processing method, and a related communication apparatus, to reduce a loss of model precision, and improve transmission efficiency.

According to a first aspect, this application provides an information transmission method. The method may be performed by a network device or by a chip disposed in the network device. This is not limited in this application. The method includes: The network device receives a first notification message sent by the terminal device, where the first notification message indicates that the terminal device has completed training on a target model, and the first notification message includes a model name corresponding to the target model; then determines policy information based on uplink channel state information of the terminal device, where the policy information is used by the terminal device to determine a lightweight method and a lightweight policy configuration; and finally sends a lightweight indication message to the terminal device, where the lightweight indication message includes the model name corresponding to the target model and the policy information, and the lightweight indication message indicates to the terminal device to perform lightweight processing on model parameter information of the target model.

In this implementation, because the policy information is determined based on the uplink channel state information, the lightweight method and the lightweight policy configuration that are determined by the terminal device by using the policy information match an uplink transmission capability of the terminal device. Therefore, a loss of model precision can be reduced, and a transmission delay requirement can be met, so that a waste of transmission resources is reduced, and transmission efficiency is improved.

In an optional implementation of this application, the policy information comprises any one of a file size condition policy, an uplink transmission rate condition policy, a transmission time condition policy, and a compression ratio condition policy. Therefore, the method further includes: The network device receives a second notification message sent by the terminal device, where the second notification message includes the model name corresponding to the target model, and the second notification message indicates that the terminal device cannot support any one of the file size condition policy, the uplink transmission rate condition policy, the transmission time condition policy, and the compression ratio condition policy.

In this implementation, because the policy information comprises any one of the file size condition policy, the uplink transmission rate condition policy, the transmission time condition policy, and the compression ratio condition policy, the second notification message indicates that the terminal device cannot perform lightweight processing when various conditional policies are met. Consequently, the network device may determine, by using the second notification message, that lightweight processing on the target model fails. Therefore, when aggregating, by using an aggregation algorithm, model parameter information uploaded by the terminal device, and updating the model parameter information, the network device does not aggregate the model parameter information of the target model, so that it is ensured that the updated model parameter information is model parameter information obtained after lightweight processing is completed, and reliability and accuracy of updating the model parameter information are improved.

In an optional implementation of this application, the policy information is the lightweight method and the lightweight policy configuration. Therefore, the method further includes: The network device receives a third notification message sent by the terminal device, where the third notification message includes the model name corresponding to the target model, and the third notification message indicates that the terminal device cannot perform the lightweight method and the lightweight policy configuration.

In this implementation, because the policy information is the lightweight method and the lightweight policy configuration that are determined by the network device, the third notification message indicates that the terminal device cannot perform the lightweight method and the lightweight policy configuration based on a lightweight capability of the terminal device, in other words, cannot perform lightweight processing. Consequently, the network device may determine, by using the third notification message, that lightweight processing on the target model fails. Therefore, when aggregating, by using an aggregation algorithm, model parameter information uploaded by the terminal device, and updating the model parameter information, the network device does not aggregate the model parameter information of the target model, so that it is ensured that the updated model parameter information is model parameter information obtained after lightweight processing is completed, and reliability and accuracy of updating the model parameter information are improved.

In an optional implementation of this application, the policy information comprises any one of a file size condition policy, an uplink transmission rate condition policy, a transmission time condition policy, and a compression ratio condition policy. Therefore, the method further includes: The network device receives a model upload message sent by the terminal device, where the model upload message carries the lightweight method and the lightweight policy configuration.

In this implementation, the network device may determine, based on the model upload message, the lightweight method and the lightweight policy configuration that are used by the terminal device. Therefore, the network device may restore model parameter information obtained through lightweight processing. This helps ensure a compression ratio and lightweight model precision.

In an optional implementation of this application, the first notification message further includes model parameter information of the target model. Therefore, the network device determines the policy information based on the model parameter information of the target model and the uplink channel state information of the terminal device.

In this implementation, because the first notification message further includes the model parameter information of the target model, the policy information determined by using the model parameter information and the uplink channel state information can not only match an uplink transmission capability of the terminal device, but also better fit the model parameter information of the target model. Therefore, accuracy and reliability of the lightweight method and the lightweight policy configuration that are determined based on the policy information are improved.

In an optional implementation of this application, the policy information is the lightweight method and the lightweight policy configuration; or the policy information comprises any one of a file size condition policy, an uplink transmission rate condition policy, a transmission time condition policy, and a compression ratio condition policy.

In this implementation, the policy information directly indicates the lightweight method and the lightweight policy configuration, to improve efficiency of this solution, or may indicate the file size condition policy, the uplink transmission rate condition policy, the transmission time condition policy, and the compression ratio condition policy, so that the terminal device may flexibly determine the lightweight method and the lightweight policy configuration based on various conditional policies and an actual situation. In this way, flexibility of this solution is improved. In addition, because the network device is a control end of an entire federated training process, the network device specifies the lightweight method and the lightweight policy configuration that should be used by the terminal device, to help simplify an aggregation process of the model parameter information.

In an optional implementation of this application, the policy information includes a lightweight object (compression Object), and the lightweight object indicates a target type of the model parameter information of the target model. Specifically, the lightweight object indicates a parameter file type required for lightweight processing. The parameter file type may be a gradient file, a residual file, or a weight file.

In this implementation, the lightweight object included in the policy information indicates the target type of the model parameter information of the target model. Therefore, the determined policy information can match an uplink transmission capability of the terminal device, and align the parameter file types of the terminal device with those of the network device, so that accuracy of the policy information is further improved.

In an optional implementation of this application, the method further includes: The network device receives a device registration message sent by the terminal device, where the device registration message carries lightweight capability information (compression capacity) of the terminal device, and the lightweight capability information indicates at least one piece of policy information that can be supported by the terminal device.

In this implementation, by using the lightweight capability information in the device registration message, the network device can learn of the at least one piece of policy information that the terminal device can support, to align the lightweight capabilities of the terminal device and the network device. In other words, the policy information determined by the network device can be supported by the terminal device, so that a possibility that the terminal device fails to perform lightweight processing is reduced, to improve feasibility of this solution.

In an optional implementation of this application, the method further includes: The network device sends a lightweight capability query message to the terminal device, where the lightweight capability query message is used by the terminal device to determine lightweight capability information of the terminal device; and then receives a capability query acknowledgment message sent by the terminal device, where the capability query acknowledgment message carries the lightweight capability information of the terminal device, and the lightweight capability information indicates at least one piece of policy information supported by the terminal device.

In this implementation, the network device queries the lightweight capability information from the terminal device, so that the network device may obtain the lightweight capability information, to learn of the at least one piece of policy information that the terminal device can support, to align the lightweight capabilities of the terminal device and the network device. In other words, the policy information determined by the network device can be supported by the terminal device, so that a possibility that the terminal device fails to perform lightweight processing is reduced, to improve feasibility of this solution.

In an optional implementation of this application, the lightweight capability query message includes the model name corresponding to the target model.

In this implementation, based on the model name corresponding to the target model, the terminal device determines, based on the model name corresponding to the target model, the lightweight capability information that is of the target model and that the network device needs to determine, so that the lightweight capability information can meet a requirement of the target model.

In an optional implementation of this application, the lightweight indication message further includes the lightweight object, and the lightweight object indicates the target type of the model parameter information of the target model.

In this implementation, the lightweight object indicated by the lightweight indication message indicates the target type of the model parameter information of the target model. Therefore, not only can the determined policy information match an uplink transmission capability of the terminal device, but also the parameter file types of the terminal device can be aligned with those of the network device, so that accuracy of the policy information is further improved.

According to a second aspect, this application provides a lightweight processing method. The method may be performed by a terminal device, or may be performed by a chip disposed in a terminal device. This is not limited in this application. The method includes: The terminal device sends a first notification message to a network device, where the first notification message indicates that the terminal device has completed training on a target model, and the first notification message includes a model name corresponding to the target model; then receives a lightweight indication message sent by the network device, where the lightweight indication message includes the model name corresponding to the target model and policy information, the policy information is determined based on uplink channel state information of the terminal device, and the lightweight indication message indicates to the terminal device to perform lightweight processing on model parameter information of the target model; further determines a lightweight method and a lightweight policy configuration based on the policy information; and may finally perform lightweight processing on the model parameter information of the target model based on the lightweight method and the lightweight policy configuration that are determined.

In this implementation, because the policy information is determined based on the uplink channel state information, the lightweight method and the lightweight policy configuration that are determined by the terminal device by using the policy information match an uplink transmission capability of the terminal device. Therefore, lightweight processing is performed on the model parameter information of the target model by using the lightweight method and the lightweight policy configuration that match the uplink transmission capability, to reduce a loss of model precision. In addition, because the lightweight method and the lightweight policy configuration match the uplink transmission capability of the terminal device, the performed lightweight processing also meets a transmission delay requirement.

In an optional implementation of this application, the policy information comprises any one of a file size condition policy, an uplink transmission rate condition policy, a transmission time condition policy, and a compression ratio condition policy. Therefore, the method further includes: The terminal device sends a second notification message to the network device, where the second notification message includes the model name corresponding to the target model, and the second notification message indicates that the terminal device cannot support any one of the file size condition policy, the uplink transmission rate condition policy, the transmission time condition policy, and the compression ratio condition policy.

In this implementation, after failing to perform lightweight processing on the target model, the terminal device notifies the network device that lightweight processing cannot be performed when various conditional policies are met. Therefore, when updating the model parameter information, the network device does not aggregate the model parameter information of the target model, so that it is ensured that the updated model parameter information is model parameter information obtained after lightweight processing is completed, and reliability and accuracy of updating the model parameter information are improved.

In an optional implementation of this application, the policy information is the lightweight method and the lightweight policy configuration. Therefore, the method further includes: The terminal device sends a third notification message to the network device, where the third notification message includes the model name corresponding to the target model, and the third notification message indicates that the terminal device cannot perform the lightweight method and the lightweight policy configuration.

In this implementation, after failing to perform lightweight processing on the target model, the terminal device notifies the network device that the terminal device cannot perform the lightweight method and the lightweight policy configuration based on a lightweight capability of the terminal device, in other words, cannot perform lightweight processing. Therefore, when updating the model parameter information, the network device does not aggregate the model parameter information of the target model, so that it is ensured that the updated model parameter information is model parameter information obtained after lightweight processing is completed, and reliability and accuracy of updating the model parameter information are improved.

In an optional implementation of this application, the policy information comprises any one of a file size condition policy, an uplink transmission rate condition policy, a transmission time condition policy, and a compression ratio condition policy. Therefore, the method further includes: The terminal device sends a model upload message to the network device, where the model upload message carries the lightweight method and the lightweight policy configuration.

In this implementation, based on the model upload message, the network device may determine the lightweight method and the lightweight policy configuration that are used by the terminal device. Therefore, the terminal device may flexibly determine the lightweight method and the lightweight policy configuration based on a requirement of the terminal device, and the network device may also restore model parameter information obtained through lightweight processing. This helps ensure a compression ratio and lightweight model precision while improving flexibility of the lightweight method and the lightweight policy configuration.

In an optional implementation of this application, the first notification message includes the model parameter information of the target model.

In this implementation, because the first notification message further includes the model parameter information of the target model, the policy information determined by using the model parameter information and the uplink channel state information can not only match an uplink transmission capability of the terminal device, but also better fit the model parameter information of the target model, accuracy and reliability of the lightweight method and the lightweight policy configuration that are determined based on the policy information are improved, and a loss of precision when the terminal device performs lightweight processing on the target model is reduced.

In an optional implementation of this application, the policy information is the lightweight method and the lightweight policy configuration; or the policy information comprises any one of a file size condition policy, an uplink transmission rate condition policy, a transmission time condition policy, and a compression ratio condition policy.

In this implementation, the policy information directly indicates the lightweight method and the lightweight policy configuration, to improve efficiency of this solution, or may indicate the file size condition policy, the uplink transmission rate condition policy, the transmission time condition policy, and the compression ratio condition policy, so that the terminal device may flexibly determine the lightweight method and the lightweight policy configuration based on various conditional policies and an actual situation. In this way, flexibility of this solution is improved.

In an optional implementation of this application, the policy information includes a lightweight object, and the lightweight object indicates a target type of the model parameter information of the target model.

In this implementation, the lightweight object included in the policy information indicates the target type of the model parameter information of the target model. Therefore, not only the determined policy information matches an uplink transmission capability of the terminal device, but also the determined parameter file type for lightweight processing improves accuracy of the policy information. This can not only improve accuracy and reliability of the lightweight method and the lightweight policy configuration that are determined based on the policy information, but also reduce a loss of precision when the terminal device performs lightweight processing on the target model. In addition, parameter file types of the terminal device and the network device can be further aligned. Therefore, during lightweight processing, a required parameter file type is directly determined from a plurality of parameter file types, to improve efficiency of the lightweight processing.

In an optional implementation of this application, the terminal device determines the lightweight method, the lightweight policy configuration, and the lightweight object based on the policy information; and then performs, based on the lightweight method and the lightweight policy configuration, lightweight processing on the model parameter information of the target model that matches the target type.

In this implementation, because the determined policy information can not only match an uplink transmission capability of the terminal device, but also better fit the model parameter information of the target model, accuracy and reliability of the lightweight method and the lightweight policy configuration that are determined based on the policy information are improved, and a loss of precision when the terminal device performs lightweight processing on the target model is reduced. Further, by using the determined parameter file type for lightweight processing, accuracy of the policy information can be further improved, and parameter file types of the terminal device and the network device are aligned. Therefore, during lightweight processing, a required parameter file type is directly determined from a plurality of parameter file types, to improve efficiency of the lightweight processing.

In an optional implementation of this application, the method further includes: The terminal device sends a device registration message to the network device, where the device registration message carries lightweight capability information of the terminal device, and the lightweight capability information indicates at least one piece of policy information that can be supported by the terminal device.

In this implementation, by using the lightweight capability information in the device registration message, the network device can learn of the at least one piece of policy information that the terminal device can support, to align the lightweight capabilities of the terminal device and the network device. Therefore, the policy information that is determined by the network device and that is received by the terminal device can be supported by the terminal device, so that a possibility that the terminal device fails to perform lightweight processing is reduced, to improve feasibility of this solution.

In an optional implementation of this application, the method further includes: The terminal device receives a lightweight capability query message sent by the network device, where the lightweight capability query message is used by the terminal device to determine lightweight capability information of the terminal device, and the lightweight capability information indicates at least one piece of policy information supported by the terminal device; then determines, based on the lightweight capability query message, the at least one piece of policy information that is met; and finally sends a capability query acknowledgment message to the network device, where the capability query acknowledgment message carries the lightweight capability information of the terminal device.

In this implementation, the network device queries the lightweight capability information from the terminal device, the terminal device determines the at least one piece of policy information that the terminal device can support, and sends the capability query acknowledgment message to the network device, so that the network device can learn of the at least one piece of policy information that the terminal device can support, to align the lightweight capabilities of the terminal device and the network device. Therefore, the policy information that is determined by the network device and that is received by the terminal device can be supported by the terminal device, so that a possibility that the terminal device fails to perform lightweight processing is reduced, to improve feasibility of this solution.

In an optional implementation of this application, the lightweight capability query message includes the model name corresponding to the target model.

In this implementation, the terminal device determines, based on the model name corresponding to the target model, the lightweight capability information that is of the target model and that the network device needs to determine, so that the lightweight capability information can meet a requirement of the target model.

In an optional implementation of this application, the lightweight indication message further includes the lightweight object, and the lightweight object indicates the target type of the model parameter information of the target model.

In this implementation, the lightweight object indicated by the lightweight indication message indicates the target type of the model parameter information of the target model. Therefore, the determined policy information can match an uplink transmission capability of the terminal device, and the parameter file type for lightweight processing can be determined to align the parameter file types of the terminal device and the network device, so that the accuracy of the policy information is further improved.

According to a third aspect, a communication apparatus is provided. The communication apparatus has some or all functions of implementing the network device according to any one of the first aspect and the possible implementations of the first aspect. For example, a function of the apparatus may include functions in some or all embodiments of the network device in this application, or may include a function of separately implementing any one of embodiments of this application. The function may be implemented by hardware, or may be implemented by hardware executing corresponding software. The hardware or the software includes one or more units or modules corresponding to the functions.

In a possible design, a structure of the communication apparatus may include a processing module and a transceiver module. The processing module is configured to support the communication apparatus in performing a corresponding function in the foregoing method. The transceiver module is configured to support communication between the communication apparatus and another device. The communication apparatus may further include a storage module. The storage module is configured to couple to the processing module and a communication module, and stores program instructions and data that are necessary for the communication apparatus.

In an implementation, the communication apparatus includes:
  a transceiver module, configured to receive a first notification message sent by a terminal device, where the first notification message indicates that the terminal device has completed training on a target model, and the first notification message includes a model name corresponding to the target model; and
  a processing module, configured to determine policy information based on uplink channel state information of the terminal device, where the policy information is used by the terminal device to determine a lightweight communication apparatus and a lightweight policy configuration, where
  the transceiver module is further configured to send a lightweight indication message to the terminal device, where the lightweight indication message includes the model name corresponding to the target model and the policy information, and the lightweight indication message indicates to the terminal device to perform lightweight processing on model parameter information of the target model.

In an example, the processing module may be a processor or a processing unit, the transceiver module may be a transceiver, a communication interface, or a communication unit, and the storage module may be a memory or a storage unit.

In another implementation, the communication apparatus may include:
  a processor, configured to receive a first notification message sent by a terminal device, where the first notification message indicates that the terminal device has completed training on a target model, and the first notification message includes a model name corresponding to the target model; and
  a transceiver, configured to determine policy information based on uplink channel state information of the terminal device, where the policy information is used by the terminal device to determine a lightweight communication apparatus and a lightweight policy configuration, where
  the transceiver is further configured to send a lightweight indication message to the terminal device, where the lightweight indication message includes the model name corresponding to the target model and the policy information, and the lightweight indication message indicates to the terminal device to perform lightweight processing on model parameter information of the target model.

In an optional implementation of this application, the policy information comprises any one of a file size condition policy, an uplink transmission rate condition policy, a transmission time condition policy, and a compression ratio condition policy.

The transceiver module is further configured to receive a second notification message sent by the terminal device, where the second notification message includes the model name corresponding to the target model, and the second notification message indicates that the terminal device cannot support any one of the file size condition policy, the uplink transmission rate condition policy, the transmission time condition policy, and the compression ratio condition policy.

In an optional implementation of this application, the policy information is the lightweight method and the lightweight policy configuration.

The transceiver module is further configured to receive a third notification message sent by the terminal device, where the third notification message includes the model name corresponding to the target model, and the third notification message indicates that the terminal device cannot perform the lightweight method and the lightweight policy configuration.

In an optional implementation of this application, the policy information comprises any one of a file size condition policy, an uplink transmission rate condition policy, a transmission time condition policy, and a compression ratio condition policy.

The transceiver module is further configured to receive a model upload message sent by the terminal device, where the model upload message carries the lightweight communication apparatus and the lightweight policy configuration.

In an optional implementation of this application, the first notification message includes the model parameter information of the target model.

The processing module is configured to determine, by a network device, the policy information based on the model parameter information of the target model and the uplink channel state information of the terminal device.

In an optional implementation of this application, the policy information is the lightweight communication apparatus and the lightweight policy configuration; or
  the policy information comprises any one of a file size condition policy, an uplink transmission rate condition policy, a transmission time condition policy, and a compression ratio condition policy.

In an optional implementation of this application, the policy information includes a lightweight object, and the lightweight object indicates a target type of the model parameter information of the target model.

In an optional implementation of this application, the transceiver module is further configured to receive a device registration message sent by the terminal device, where the device registration message carries lightweight capability information of the terminal device, and the lightweight capability information indicates at least one piece of policy information supported by the terminal device.

In an optional implementation of this application, the transceiver module is further configured to send, by a network device, a lightweight capability query message to the terminal device, where the lightweight capability query message is used by the terminal device to determine lightweight capability information of the terminal device; and
  the transceiver module is further configured to receive a capability query acknowledgment message sent by the terminal device, where the capability query acknowledgment message carries the lightweight capability information of the terminal device, and the lightweight capability information indicates at least one piece of policy information supported by the terminal device.

In an optional implementation of this application, the lightweight capability query message includes the model name corresponding to the target model.

In an optional implementation of this application, the lightweight indication message further includes the lightweight object, and the lightweight object indicates the target type of the model parameter information of the target model.

During implementation, the processor may be configured to perform, for example, but not limited to, baseband related processing; and the transceiver may be configured to perform, for example, but not limited to, radio frequency receiving and sending. The foregoing devices may be separately disposed on chips that are independent of each other, or at least some or all of the devices may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of devices may be integrated to a same chip. For example, a digital baseband processor and a plurality of application processors (including but not limited to a graphics processing unit and a multimedia processor) may be integrated on a same chip. Such a chip may be referred to as a system on chip (System on Chip). Whether the devices are separately disposed on different chips or integrated and disposed on one or more chips usually depends on a requirement of a product design. Implementation forms of the foregoing devices are not limited in this embodiment of this application.

According to a fourth aspect, a communication apparatus is provided, and includes a processor. The processor is coupled to a memory, and may be configured to execute instructions in the memory, to implement the method according to any one of the possible implementations of the first aspect. Optionally, the communication apparatus further includes the memory. Optionally, the communication apparatus further includes a communication interface. The processor is coupled to the communication interface. The communication interface is configured to input and/or output information. The information includes at least one of instructions and data.

In an implementation, the communication apparatus is a network device. When the communication apparatus is the network device, the communication interface may be a transceiver or an input/output interface.

Optionally, the transceiver may be a transceiver circuit. Optionally, the input/output interface may be an input/output circuit.

In another implementation, the communication apparatus is a chip or a chip system disposed in a network device. When the communication apparatus is the chip or the chip system disposed in the network device, the communication interface may be an input/output interface, an interface circuit, an output circuit, an input circuit, a pin, a related circuit, or the like. The processor may alternatively be embodied as a processing circuit or a logic circuit.

According to a fifth aspect, a communication apparatus is provided. The communication apparatus has some or all functions of implementing the terminal device according to any one of the second aspect and the possible implementations of the second aspect. For example, a function of the apparatus may include functions in some or all embodiments of the terminal device in this application, or may include a function of separately implementing any one of embodiments of this application. The function may be implemented by hardware, or may be implemented by hardware executing corresponding software. The hardware or the software includes one or more units or modules corresponding to the functions.

In a possible design, a structure of the communication apparatus may include a processing module and a transceiver module. The processing module is configured to support the communication apparatus in performing a corresponding function in the foregoing method. The transceiver module is configured to support communication between the communication apparatus and another device. The communication apparatus may further include a storage module. The storage module is configured to couple to the processing module and a communication module, and stores program instructions and data that are necessary for the communication apparatus.

In an implementation, the communication apparatus includes:

a transceiver module, configured to send, by a terminal device, a first notification message to a network device, where the first notification message indicates that a terminal device has completed training on a target model, and the first notification message includes a model name corresponding to the target model, where the transceiver module is further configured to receive a lightweight indication message sent by the network device, where the lightweight indication message includes the model name corresponding to the target model and policy information, the policy information is determined based on uplink channel state information of the terminal device, and the lightweight indication message indicates to the terminal device to perform lightweight processing on model parameter information of the target model; and a processing module, configured to determine a lightweight communication apparatus and a lightweight policy configuration based on the policy information, where the processing module is further configured to perform lightweight processing on model parameter information of the target model based on the lightweight communication apparatus and the lightweight policy configuration.

For related content of this implementation, refer to the related content of the second aspect. Details are not described herein again.

In an example, the processing module may be a processor or a processing unit, the transceiver module may be a transceiver, a communication interface, or a communication unit, and the storage module may be a memory or a storage unit.

In another implementation, the communication apparatus may include:

a transceiver, configured to send, by a terminal device, a first notification message to a network device, where the first notification message indicates that a terminal device has completed training on a target model, and the first notification message includes a model name corresponding to the target model, where:

the transceiver is further configured to receive a lightweight indication message sent by the network device, where the lightweight indication message includes the model name corresponding to the target model and policy information, the policy information is determined based on uplink channel state information of the terminal device, and the lightweight indication message indicates to the terminal device to perform lightweight processing on model parameter information of the target model; and a processor, configured to determine a lightweight communication apparatus and a lightweight policy configuration based on the policy information, where the processor is further configured to perform lightweight processing on model parameter information of the target model based on the lightweight communication apparatus and the lightweight policy configuration.

In an optional implementation of this application, the policy information comprises any one of a file size condition policy, an uplink transmission rate condition policy, a transmission time condition policy, and a compression ratio condition policy.

The transceiver is further configured to send a second notification message to the network device, where the second notification message includes the model name corresponding to the target model, and the second notification message indicates that the terminal device cannot support any one of the file size condition policy, the uplink transmission rate condition policy, the transmission time condition policy, and the compression ratio condition policy.

In an optional implementation of this application, the policy information is the lightweight method and the lightweight policy configuration.

The transceiver module is further configured to send a third notification message to the network device, where the third notification message includes the model name corresponding to the target model, and the third notification message indicates that the terminal device cannot perform the lightweight method and the lightweight policy configuration.

In an optional implementation of this application, the policy information comprises any one of a file size condition policy, an uplink transmission rate condition policy, a transmission time condition policy, and a compression ratio condition policy.

The transceiver module is further configured to send a model upload message to the network device, where the model upload message carries the lightweight communication apparatus and the lightweight policy configuration.

The first notification message includes the model parameter information of the target model.

In an optional implementation of this application, the policy information is the lightweight communication apparatus and the lightweight policy configuration; or the policy information comprises any one of a file size condition policy, an uplink transmission rate condition policy, a transmission time condition policy, and a compression ratio condition policy.

In an optional implementation of this application, the policy information includes a lightweight object, and the lightweight object indicates a target type of the model parameter information of the target model.

In an optional implementation of this application, the processing module is configured to determine the lightweight communication apparatus, the lightweight policy configuration, and the lightweight object based on the policy information.

The processing module is configured to perform, based on the lightweight communication apparatus and the lightweight policy configuration, lightweight processing on the model parameter information of the target model that fits the target type.

In an optional implementation of this application, the transceiver module is further configured to send a device registration message to the network device, where the device registration message carries lightweight capability information of the terminal device, and the lightweight capability information indicates at least one piece of policy information supported by the terminal device.

In an optional implementation of this application, the transceiver module is further configured to receive a lightweight capability query message sent by the network device, where the lightweight capability query message is used by the terminal device to determine lightweight capability information of the terminal device, and the lightweight capability information indicates at least one piece of policy information supported by the terminal device.

The processing module is further configured to determine, based on the lightweight capability query message, the at least one piece of policy information that is met.

The transceiver module is further configured to send a capability query acknowledgment message to the network device, where the capability query acknowledgment message carries the lightweight capability information of the terminal device.

In an optional implementation of this application, the lightweight capability query message includes the model name corresponding to the target model.

In an optional implementation of this application, the lightweight indication message further includes the lightweight object, and the lightweight object indicates the target type of the model parameter information of the target model.

During implementation, the processor may be configured to perform, for example, but not limited to, baseband related processing; and the transceiver may be configured to perform, for example, but not limited to, radio frequency receiving and sending. The foregoing devices may be separately disposed on chips that are independent of each other, or at least some or all of the devices may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of devices may be integrated to a same chip. For example, a digital baseband processor and a plurality of application processors (including but not limited to a graphics processing unit and a multimedia processor) may be integrated on a same chip. Such a chip may be referred to as a system on chip (System on Chip). Whether the devices are separately disposed on different chips or integrated and disposed on one or more chips usually depends on a requirement of a product design. Implementation forms of the foregoing devices are not limited in this embodiment of this application.

According to a sixth aspect, a communication apparatus is provided, and includes a processor. The processor is coupled to a memory, and may be configured to execute instructions in the memory, to implement the method according to any one of the possible implementations of the second aspect. Optionally, the communication apparatus further includes the memory. Optionally, the communication apparatus further includes a communication interface. The processor is coupled to the communication interface. The communication interface is configured to input and/or output information. The information includes at least one of instructions and data.

In an implementation, the communication apparatus is a terminal device. When the communication apparatus is the terminal device, the communication interface may be a transceiver or an input/output interface.

Optionally, the transceiver may be a transceiver circuit. Optionally, the input/output interface may be an input/output circuit.

In another implementation, the communication apparatus is a chip or a chip system disposed in a terminal device. When the communication apparatus is the chip or the chip system disposed in the terminal device, the communication interface may be an input/output interface, an interface circuit, an output circuit, an input circuit, a pin, a related circuit, or the like. The processor may alternatively be embodied as a processing circuit or a logic circuit.

According to a seventh aspect, a processor is provided, and includes: an input circuit, an output circuit, and a processing circuit. The processing circuit is configured to receive a signal through the input circuit, and transmit a signal through the output circuit, so that the processor performs the method according to any one of the possible implementations of the first aspect and the second aspect.

During specific implementation, the processor may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to an eighth aspect, a communication apparatus is provided, and includes a communication interface and a processor. The communication interface is coupled to the processor. The communication interface is configured to input and/or output information. The information includes at least one of instructions and data. The processor is configured to execute a computer program, to enable the communication apparatus to perform the method according to any one of the possible implementations of the first aspect and the second aspect.

Optionally, there are one or more processors, and there are one or more memories.

According to a ninth aspect, a communication apparatus is provided, and includes a processor and a memory. The processor is configured to read instructions stored in the memory, and may receive a signal through a receiver, and transmit a signal through a transmitter, to enable the communication apparatus to perform the method according to any one of the possible implementations of the first aspect and the second aspect.

Optionally, there are one or more processors, and there are one or more memories.

Optionally, the memory may be integrated with the processor, or the memory and the processor are separately disposed.

During specific implementation, the memory may be a non-transitory (non-transitory) memory, such as a read-only memory (ROM). The memory and the processor may be integrated on one chip, or may be separately disposed in different chips. A type of the memory and a manner in which the memory and the processor are disposed are not limited in this embodiment of this application.

It should be understood that a related information exchange process, for example, sending indication information, may be a process of outputting the indication information from the processor, and receiving the indication information may be a process of inputting the received indication information to the processor. Specifically, the information output by the processor may be output to the transmitter, and the input information received by the processor may be from the receiver. The transmitter and the receiver may be collectively referred to as a transceiver.

The communication apparatus in the eighth aspect and the ninth aspect may be a chip, and the processor may be implemented by hardware or software. When the processor is implemented by the hardware, the processor may be a logic circuit, an integrated circuit, or the like. When the processor is implemented by the software, the processor may be a general-purpose processor, and is implemented by reading software code stored in a memory. The memory may be integrated into the processor, or may be located outside the processor and exist independently.

According to a tenth aspect, a computer program product is provided. The computer program product includes a computer program (which may also be referred to as code or instructions). When the computer program is run, a computer is enabled to perform the method according to any one of the possible implementations of the first aspect and the second aspect.

According to an eleventh aspect, a computer-readable storage medium is provided. The computer-readable storage medium stores a computer program (which may also be referred to as code or instructions). When the computer program is run on a computer, the computer is enabled to perform the method according to any one of the possible implementations of the first aspect and the second aspect.

According to a twelfth aspect, a communication system is provided, and includes the foregoing terminal device and network device.

According to a thirteenth aspect, this application provides a chip system. The chip system includes a processor and an interface. The interface is configured to obtain a program or instructions. The processor is configured to invoke the program or the instructions to implement or support a network device in implementing a function in the first aspect, for example, determining or processing at least one of data and information in the foregoing method.

In a possible design, the chip system further includes a memory. The memory is configured to store program instructions and data that are necessary for the network device. The chip system may include a chip, or may include a chip and another discrete device.

According to a fourteenth aspect, this application provides a chip system. The chip system includes a processor and an interface. The interface is configured to obtain a program or instructions. The processor is configured to invoke the program or the instructions to implement or support a terminal device in implementing a function in the second aspect, for example, determining or processing at least one of data and information in the foregoing method.

In a possible design, the chip system further includes a memory. The memory is configured to store program instructions and data that are necessary for the terminal device. The chip system may include a chip, or may include a chip and another discrete device.

It should be noted that beneficial effects brought by the implementations of the third aspect to the fourteenth aspect of this application may be understood with reference to the implementations of the first aspect and the second aspect. Therefore, details are not repeated.

According to the technical solutions provided in this application, the terminal device sends, to the network device, the first notification message including the model name corresponding to the target model, where the first notification message indicates that the terminal device has completed the training on the target model. Therefore, the network device learns, by using the first notification message, that the terminal device has completed the training on the target model, then determines the policy information based on the uplink channel state information of the terminal device, and sends, to the terminal device, the lightweight indication message including the model name corresponding to the target model and the policy information, so that the terminal device determines the lightweight method and the lightweight policy configuration based on the policy information, and performs lightweight processing on the model parameter information of the target model based on the lightweight method and the lightweight policy configuration. Because the policy information is determined based on the uplink channel state information, the lightweight method and the lightweight policy configuration that are determined by the terminal device by using the policy information match an uplink transmission capability of the terminal device. Therefore, a loss of model precision can be reduced, and a transmission delay requirement can be met, so that a waste of transmission resources is reduced, and transmission efficiency is improved.

DESCRIPTION OF EMBODIMENTS

Figure 1:
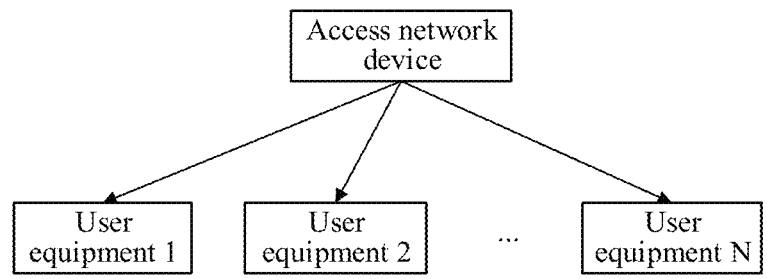
FIG. 1 is a schematic diagram of a system framework according to an embodiment of this application.
Figure 1:
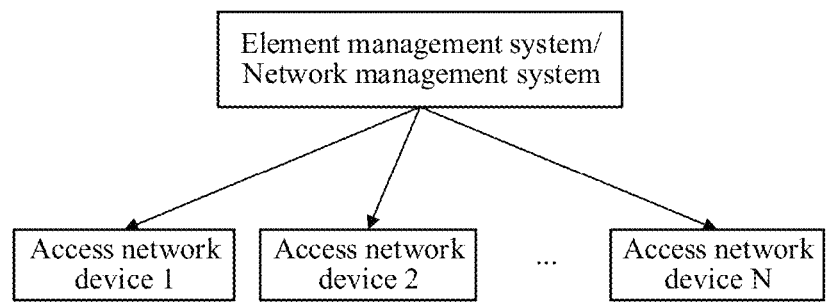
Figure 1:
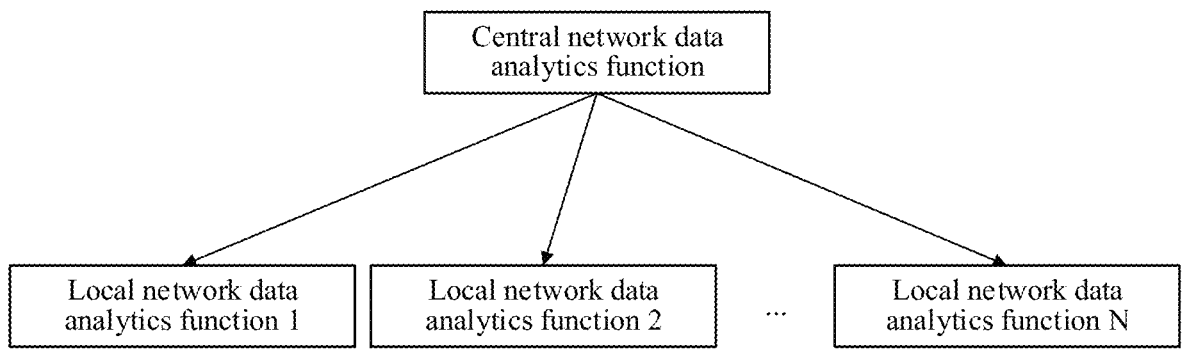

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, and a universal mobile telecommunications system (UMTS). With continuous development of the communication system, the technical solutions in this application may be applied to a 5th generation (5G) system or a new radio (NR) system, or may be applied to a future network, such as a 6G system or even a future system, or may be applied to a device-to-device (D2D) system, a machine-to-machine (M2M) system, or the like.

It should be understood that the network device in the communication system may be any device having a wireless transceiver function or a chip that may be disposed in the device, where the device includes but is not limited to: an evolved NodeB (eNB), a radio network controller (RNC), a NodeB (NB), a base station controller (BSC), a base transceiver station (BTS), a home base station (for example, a Home evolved NodeB, or Home NodeB, HNB), a baseband unit (BBU), an access point (AP) in a wireless fidelity (Wi-Fi) system, a wireless relay node, a wireless backhaul node, a transmission point (TP), or a transmission reception point (TRP); or may be a device used in a 5G, 6G, or even future system, for example, a gNB in an NR system, or a transmission point (TRP or TP), or one or a group of antenna panels (including a plurality of antenna panels) of a base station in a 5G system; or may be a network node forming a gNB or a transmission point, for example, a baseband unit (BBU), a distributed unit (DU), a pico base station (picocell), a femto base station (femtocell), a vehicle-to-everything (V2X), or a roadside unit (RSU) in an intelligent driving scenario.

In some deployments, a gNB may include a central unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical layer (PHY). Information at the RRC layer eventually becomes information at the PHY layer, or is converted from the information at the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including the CU node and the DU node. In addition, the CU may be classified as a network device in a radio access network (RAN), or the CU may be classified as a network device in a core network CN. This is not limited herein.

In embodiments disclosed this application, a communication apparatus configured to implement a function of the network device may be a network device, or may be a communication apparatus, for example, a chip system, that can support the network device in implementing this function. The communication apparatus may be mounted in the network device.

It should be further understood that the terminal device in the communication system may also be referred to as a UE, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone (mobile phone), a tablet computer (pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a wireless terminal or an RSU of a wireless terminal type in V2X vehicle-to-everything, or the like. An application scenario is not limited in embodiments of this application.

In addition, to facilitate understanding of embodiments of this application, the following several descriptions are provided.

First, in this application, for ease of description, when numbering is used, consecutive numbering may start from 0. For example, the $0^{th}$ symbol in a slot may be an initial symbol in the slot. Certainly, a specific implementation is not limited thereto. For example, consecutive numbering may alternatively start from 1. For example, the first symbol in a slot may also be an initial symbol in the slot. Because start values of numbers are different, numbers corresponding to a same symbol in a slot are also different.

It should be understood that the foregoing descriptions are all provided to help describe the technical solutions provided in embodiments of this application, but are not intended to limit the scope of this application.

Second, in the embodiments shown below, technical features in a type of technical features are distinguished by using "first", "second", "third", and the like. The technical features described by "first", "second", and "third" have no sequence or size sequence.

Third, "at least one" indicates one or more, and "a plurality of" indicates two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, and c may represent: a, b, c, a and b, a and c, b and c, or a, b, and c, where a, b, and c each may be singular or plural.

Fourth, in embodiments shown below, an NR network scenario in a wireless communication network is used as an example to describe some scenarios. It should be noted that the solutions in embodiments disclosed in this application may be further applied to another wireless communication network, and a corresponding name may also be replaced with a name of a corresponding function in the other wireless communication network.

Fifth, aspects, embodiments, or features of this application are presented in embodiments disclosed in this application by describing a system that includes a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

Sixth, in embodiments disclosed in this application, "of (of)", "related (related)", and "corresponding (corresponding)" may be interchangeably used sometimes. It should be noted that expressed meanings are consistent when differences are not emphasized.

To better understand an information transmission method, a lightweight processing method, and a related communication apparatus disclosed in embodiments of this application, a system architecture of a communication system used in embodiments of the present disclosure is first described. FIG. 1 is a schematic diagram of a system framework according to an embodiment of this application. In a UE-RAN system shown in (A) in FIG. 1, horizontal federated learning is performed between a plurality of UEs, the UE is a participant in a horizontal federated learning process, and a RAN is a coordinator in the horizontal federated learning process. Further, the method disclosed in embodiments of this application is further applicable to another system architecture. For example, in a RAN-system under a network management scenario shown in (B) in FIG. 1, horizontal federated learning is performed between a plurality of RANs, the RAN is a participant in a horizontal federated learning process, and an element management system (EMS) and/or a network management system (NMS) are/is a coordinator in the horizontal federated learning process. In addition, in a system under an enabler of network automation (eNA) architecture shown in (C) in FIG. 1, horizontal federated learning is performed between a plurality of local network data analytics functions (local NWDAFs), the local NWDAF is a participant in a horizontal federated learning process, and a central network data analytics function (central NWDAF) is a coordinator in the horizontal federated learning process.

Next, some terms or concepts in embodiments of this application are described, to help a person skilled in the art have a better understanding.

1. Federated Learning

Federated learning is an encrypted distributed machine learning technology, and can fully use data and computing capabilities of participants, so that a plurality of parties cooperatively build a common and robust machine learning model without sharing data. In an environment with increasingly strict data supervision, federated learning can resolve key problems such as data ownership, data privacy, a data access right, and heterogeneous data access. In a wireless scenario, to ensure data security or reduce an information transmission amount, a model may be trained through federated learning.

2. Horizontal Federated Learning

Figure 2:
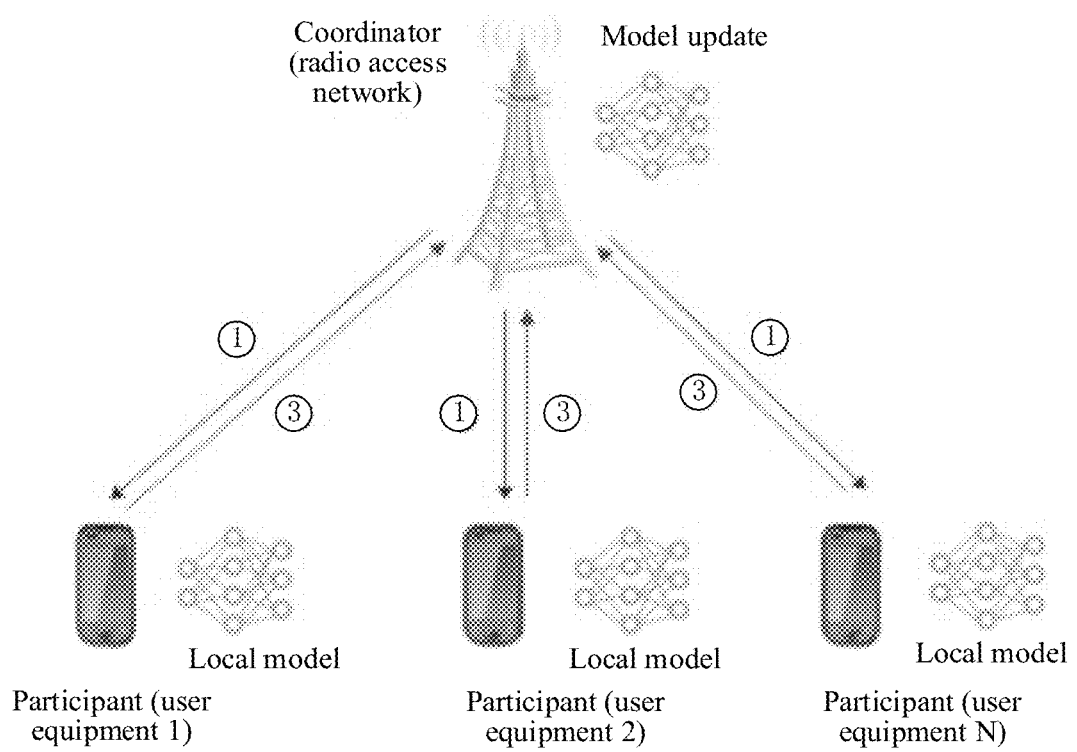
FIG. 2 is a schematic diagram in which horizontal federated learning is applied to a UE-RAN system according to an embodiment of this application.

Horizontal federated learning is a key branch of federated learning. A horizontal federation includes a coordinator and several participants. The participants are responsible for training models by using local data, and the coordinator is responsible for aggregating the models of the participants. For ease of understanding, FIG. 2 is a schematic diagram in which horizontal federated learning is applied to a UE-RAN system according to an embodiment of this application. As shown in the figure, in horizontal federated learning, a coordinator (RAN) sends a model to a plurality of participants (a plurality of user equipment), and the plurality of participants separately train the model by using respective datasets, and after completing training on the model, the plurality of participants send model parameter information obtained through training to the coordinator, so that the coordinator aggregates (for example, by using a federated averaging algorithm) the model parameter information received from the participants, and then updates the model. The foregoing process is repeated until the model is converged, a maximum quantity of times is reached, or maximum training time is reached.

3. AI Model Lightweight Technology

A goal of the AI model lightweight technology is to reduce storage space or a computing amount at the cost of a specific degree of model precision loss. Currently, the common and mature model lightweight technology includes model pruning and model quantization.

Figure 3:
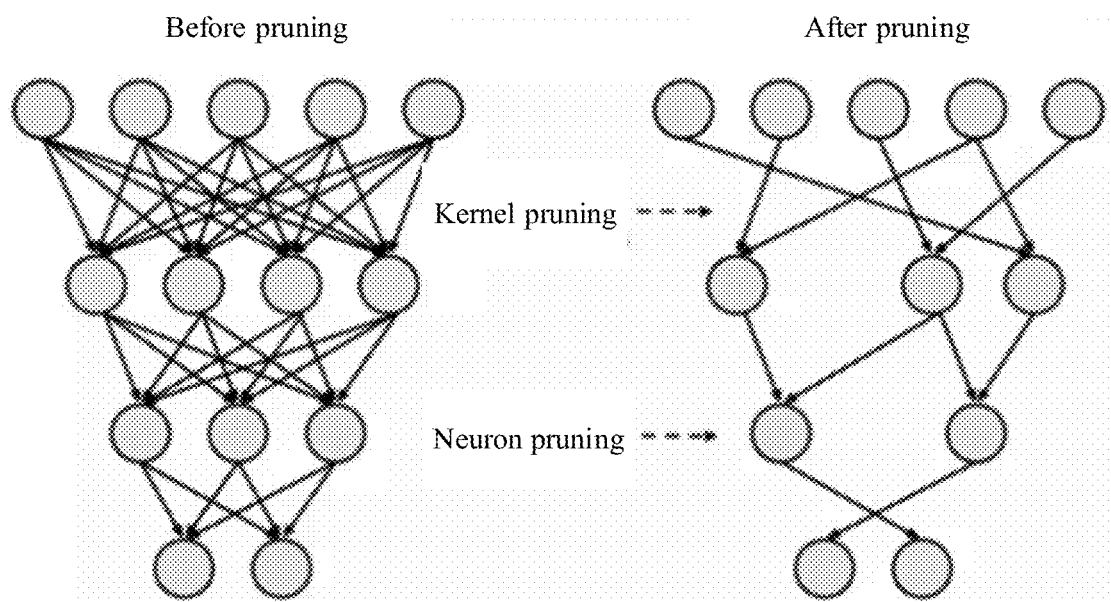
FIG. 3 is a schematic diagram of model pruning according to an embodiment of this application.

To facilitate understanding of the model pruning, FIG. 3 is a schematic diagram of the model pruning according to an embodiment of this application. As shown in the figure, a principle of the model pruning is to compress network storage space by removing a redundant connection in a neural network. The redundant connection herein is mainly a connection with a small weight in the neural network. In a model pruning method, a pruning policy, for example, a pruning ratio and a pruning manner of each layer in the neural network, needs to be configured. A model processed using the model pruning method may be directly used for model retraining or model inference. Specifically, the pruning manner in some embodiments of this application includes but is not limited to weight pruning, neuron pruning, channel pruning, and core pruning.

Figure 4:
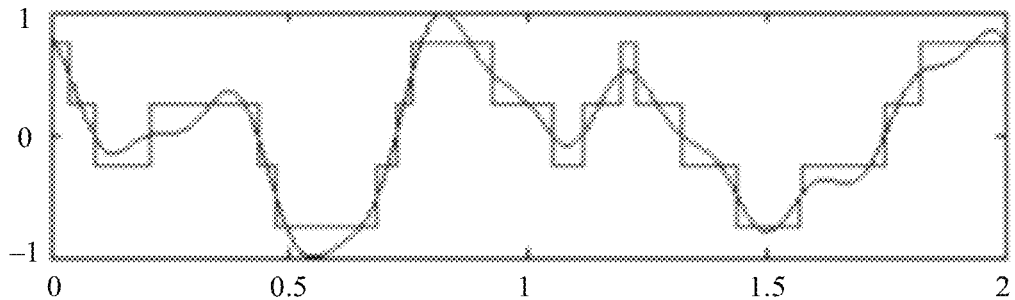
FIG. 4 is a schematic diagram of model quantization according to an embodiment of this application.

To help understand model quantization, FIG. 4 is a schematic diagram of the model quantization according to an embodiment of this application. As shown in the figure, a principle of the model quantization is to compress an original network by reducing a quantity of bits required for representing a weight of a neural network. Usually, parameter information of a deep learning model is a 32-bit floating-point type, and a weight of the 32-bit floating-point type may be quantized to 16 bits, 8 bits, 4 bits, 2 bits, or even 1 bit by using a model quantization method, to greatly compress storage space occupied by the network. In the model quantization method, a quantization policy needs to be configured. The quantization policy includes but is not limited to a quantity of quantized bits, a quantization manner, a quantization step, and a zero-value offset. A model processed by using the model quantization method needs to be restored to some extent before being used for model retraining or model inference. Specifically, the quantization manner in some embodiments of this application includes but is not limited to uniform quantization and non-uniform quantization.

4. Lightweight Method

The lightweight method indicates a type of a method for performing lightweight processing on an AI model, and may include a general-purpose lightweight method and a customized lightweight method. In some embodiments of this application, lightweight processing indicates a size of storage space for compressing model parameter information. The general-purpose lightweight method indicates a common and mature technology in the industry, and includes but is not limited to model pruning, model quantization, or a combination of pruning and quantization. The customized lightweight method indicates a model compression method customized for a specific model.

5. Lightweight Policy Configuration

The lightweight policy configuration indicates that each lightweight method corresponds to a parameter configuration template. When a lightweight method is used, a parameter of the template corresponding to the method needs to be filled, and filled content is the lightweight policy configuration. For example, for a model pruning lightweight method, a parameter configuration template may include a pruning ratio, a pruning manner, and the like of each layer in a neural network.

6. Compression Ratio (Compression Ratio)

The compression ratio indicates a ratio of a size of a model parameter information file after lightweight processing to a size of a model parameter information file before the lightweight processing.

It can be learned that, to reduce communication overheads, after completing training on a local model, a UE may select, according to a rule from lightweight methods supported by the UE, a lightweight method and a lightweight policy configuration to perform lightweight processing on the local model, and then upload model parameter information. The selected lightweight method is a method that may be directly applied without restoring the lightweight model parameter information. However, when an uplink transmission rate is high, if the UE uses a lightweight method and a lightweight policy configuration that have a high compression ratio, model precision is greatly affected. As a result, precision after aggregation is reduced. Alternatively, when an uplink transmission rate is low, if the UE uses a lightweight method and a lightweight policy configuration that have a low compression ratio, an excessively large amount of model parameter information is transferred. As a result, a waste of transmission resources can be caused, and transmission efficiency is reduced.

To resolve the foregoing problem, embodiments of this application provide an information transmission method and a lightweight processing method, to reduce a loss of model precision and meet a transmission delay requirement, so that a waste of transmission resources is reduced, and transmission efficiency is improved.

Figure 5:
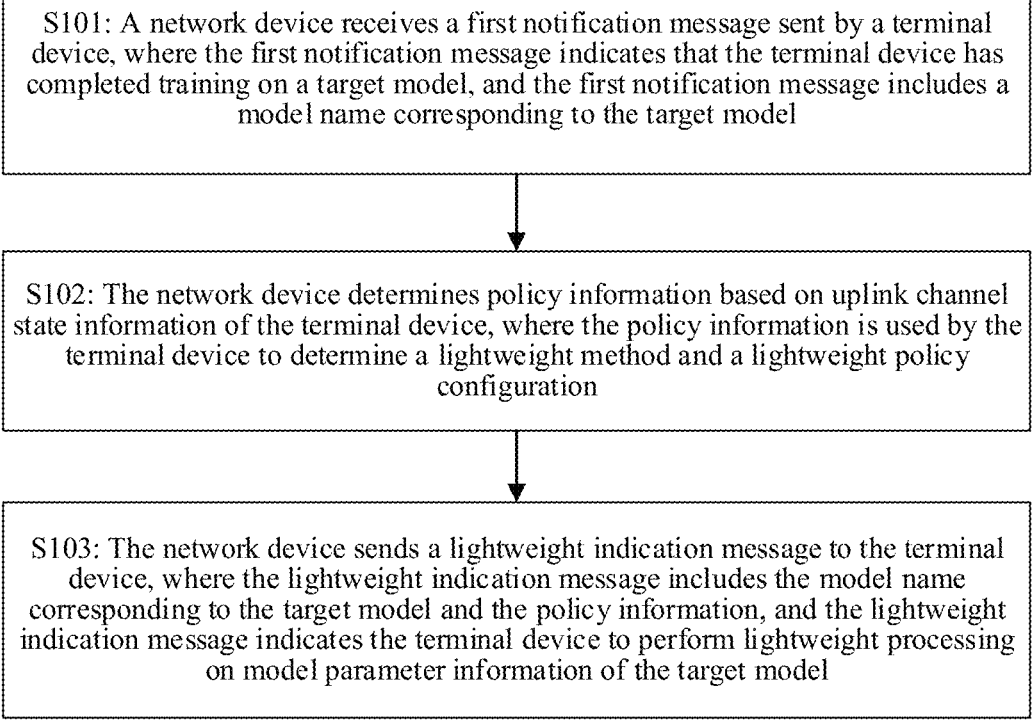
FIG. 5 is a schematic diagram of an embodiment of an information transmission method according to an embodiment of this application.

The following first describes in detail, by using a network device as an execution body, the information transmission method used in embodiments of this application. FIG. 5 is a schematic diagram of an embodiment of an information transmission method according to an embodiment of this application. The information transmission method includes the following steps.

S101: A network device receives a first notification message sent by a terminal device, where the first notification message indicates that the terminal device has completed training on a target model, and the first notification message includes a model name corresponding to the target model.

In some embodiments, the network device may select, by using an internal algorithm, the terminal device that needs to participate in training the target model, and then send a model training message to the terminal device that trains the target model. The model training message includes the model name of the target model and a model file of the target model. In this way, the terminal device may perform model training on the target model by using local data. After the terminal device has completed the training on the target model, the terminal device may send the first notification message to the network device, and the first notification message includes the model name (modelName) corresponding to the target model, so that the network device determines, based on the first notification information, that the terminal device has completed the training on the target model. For example, the terminal device is training a model A, a model B, and a model C. When the terminal device has completed the training on the model A, the terminal device may determine the model A as the target model, and send, to the network device, a first notification message carrying a model name "model A". After obtaining the first notification message, the network device may determine that the terminal device has completed the training on the model A.

Optionally, the first notification message may further include model parameter information (modelParameterInfo) of the target model. Specifically, in some embodiments, modelParameterInfo is parameter file information (parameterInfo), and parameterInfo is parameter file information corresponding to a parameter file type that has been agreed upon by the terminal device and the network device in advance. The parameter file type may be a gradient file, a residual file, or a weight file. In addition, parameterInfo may be a size of a parameter file, sparseness of a parameter file, or information that helps the network device determine a lightweight method and a lightweight policy configuration. This is not specifically limited herein. Therefore, when the first notification message may further include the model parameter information, the terminal device may feed back, to the network device, information about a parameter file of another type other than the agreed type, to help the network device formulate lightweight indication information that is more suitable for the target model, and further ensure lightweight model precision. In addition, whether the model parameter information is included needs to be autonomously determined by the terminal device based on a feature of the model parameter information. For example, when the parameter file type agreed upon in advance is the weight file, if the terminal device determines that sparseness of the residual file is higher, a model precision loss after lightweight processing may be smaller. In this case, the terminal device may feed back information about the residual file to the network device by feeding back the model parameter information, to reduce the model precision loss after the lightweight processing.

Optionally, the model parameter information is in a form of a list, and each item in the list is <parameterType, parameterInfo>, where parameterType indicates the parameter file type, and parameterInfo indicates the parameter file information.

S102: The network device determines policy information based on uplink channel state information of the terminal device, where the policy information is used by the terminal device to determine a lightweight method and a lightweight policy configuration.

In some embodiments, the network device obtains the uplink channel state information of the terminal device through measurement, allocates an uplink transmission resource to the terminal device, and then determines the policy information based on the uplink channel state information. The policy information is used by the terminal device to determine the lightweight method and the lightweight policy configuration. Specifically, the lightweight method includes model pruning and/or model quantization.

Optionally, the policy information may be any one of a file size condition policy, an uplink transmission rate condition policy, a transmission time condition policy, and a compression ratio condition policy, or the policy information is the lightweight method and the lightweight policy configuration. The file size condition policy is a parameter file size requirement corresponding to a parameter file, and is a maximum parameter file size that the selected lightweight method and lightweight policy configuration can reach. The uplink transmission rate condition policy is a rate requirement corresponding to an uplink transmission rate, and is a maximum uplink transmission rate that the selected lightweight method and lightweight policy configuration can reach. The transmission time condition policy is a time requirement corresponding to transmission time and is the maximum transmission time that the selected lightweight method and lightweight policy configuration can reach. The compression ratio condition policy is a compression ratio requirement corresponding to a compression ratio, and is a maximum compression ratio that the selected lightweight method and lightweight policy configuration can reach. For example, the maximum transmission time in the time requirement is 2 seconds. In other words, transmission time in the lightweight method and the lightweight policy configuration cannot exceed 2 seconds. Alternatively, the parameter file size requirement is that the maximum parameter file size is 10 MB (Mbyte). In other words, a transmission size of the parameter file obtained by using the lightweight method and the lightweight policy configuration cannot exceed 10 MB. It should be understood that the foregoing examples are merely used to understand this solution. A specific condition policy needs to be flexibly determined based on an actual situation. This is not specifically limited herein.

Optionally, the policy information may further include a lightweight object, and the lightweight object indicates a target type of the model parameter information of the target model. In some embodiments, the lightweight object may be a gradient file, a residual file, or a weight file. Specifically, in step S101, if the first notification message includes the model parameter information of the target model, and the model parameter information includes only the parameter file information corresponding to a default parameter file type, the policy information does not need to include the lightweight object. In other words, both the network device and the terminal device determine to perform lightweight processing on the default parameter file type. In step S101, if the first notification message includes the model parameter information of the target model, and the model parameter information includes a plurality of parameter file types and a plurality of types of parameter file information, the network device and the terminal device need to determine, by using the policy information, a parameter file type for performing lightweight processing. Therefore, the policy information further needs to include the lightweight object.

Specifically, when the first notification message further includes the model parameter information of the target model, the network device may determine the policy information based on the uplink channel state information of the terminal device and the model parameter information of the target model. Because the policy information may be the size of the parameter file, the sparseness of the parameter file, or the information that helps the network device determine the lightweight method and the lightweight policy configuration, the policy information is further determined based on the parameter file information, so that accuracy of the determined policy information can be improved.

S103: The network device sends a lightweight indication message to the terminal device, where the lightweight indication message includes the model name corresponding to the target model and the policy information, and the lightweight indication message indicates to the terminal device to perform lightweight processing on model parameter information of the target model.

In some embodiments, the network device sends the lightweight indication message to the terminal device, where the lightweight indication message includes the model name corresponding to the target model and the policy information, and the lightweight indication message indicates to the terminal device to perform lightweight processing on the model parameter information of the target model.

Specifically, when the policy information is the lightweight method and the lightweight policy configuration, the lightweight method may be represented in a form of a bitmap (bitmap) or a plaintext. Therefore, when the lightweight method is transmitted in the form of the bitmap, each bit represents a method. If the bit is 1, it indicates that the method is used. If the bit is 0, it indicates that the method is not used. For example, when the bitmap is 00000010, it indicates that the second lightweight method is used. In addition, the lightweight policy configuration is a specific configuration for a specified lightweight method. It can be learned from the foregoing term or concept descriptions that each lightweight method has a fixed parameter template, and the policy configuration provides an instance of the parameter template. Because the network device is a control end of an entire federated training process, the network device specifies the lightweight method and the lightweight policy configuration that should be used by the terminal device, to help simplify an aggregation process of the model parameter information. For example, the network device may specify a same type of lightweight method or a same type of lightweight object for different terminal devices, to facilitate model parameter information aggregation.

In addition, when the policy information comprises any one of the file size condition policy, the uplink transmission rate condition policy, the transmission time condition policy, and the compression ratio condition policy, the terminal device needs to determine a lightweight method and a lightweight policy configuration that support at least one of the conditional policies. In this case, because the lightweight method and the lightweight policy configuration are autonomously determined by the terminal device based on the policy information, if the determined lightweight method and lightweight policy configuration can match a lightweight capability of the terminal device, the terminal device may implement the determined lightweight method and lightweight policy configuration. In addition, there may also be a case in which the lightweight method and the lightweight policy configuration that are supported by the terminal device do not support the condition policy. In this case, the lightweight processing fails, and the terminal device sends a second notification message to the network device. The second notification message includes the model name corresponding to the target model. The second notification message indicates that the lightweight method and the lightweight policy configuration that are supported by the terminal device cannot support any one of the file size condition policy, the uplink transmission rate condition policy, the transmission time condition policy, and the compression ratio condition policy, in other words, the terminal device fails to perform lightweight processing on the target model. Further, if the policy information is the lightweight method and the lightweight policy configuration, in other words, the lightweight method and the lightweight policy configuration are determined by the network device, the lightweight method and the lightweight policy configuration may not match a lightweight capability of the terminal device. Therefore, when the lightweight capability of the terminal device is not met, the terminal device sends a third notification message to the network device. The third notification message includes the model name corresponding to the target model. The third notification message indicates that the terminal device cannot perform the lightweight method and the lightweight policy configuration, in other words, the terminal device fails to perform lightweight processing on the target model. Whether the network device receives the second notification message or the third notification message needs to be determined depending on whether the terminal device successfully performs lightweight processing on the target model.

Figure 6:
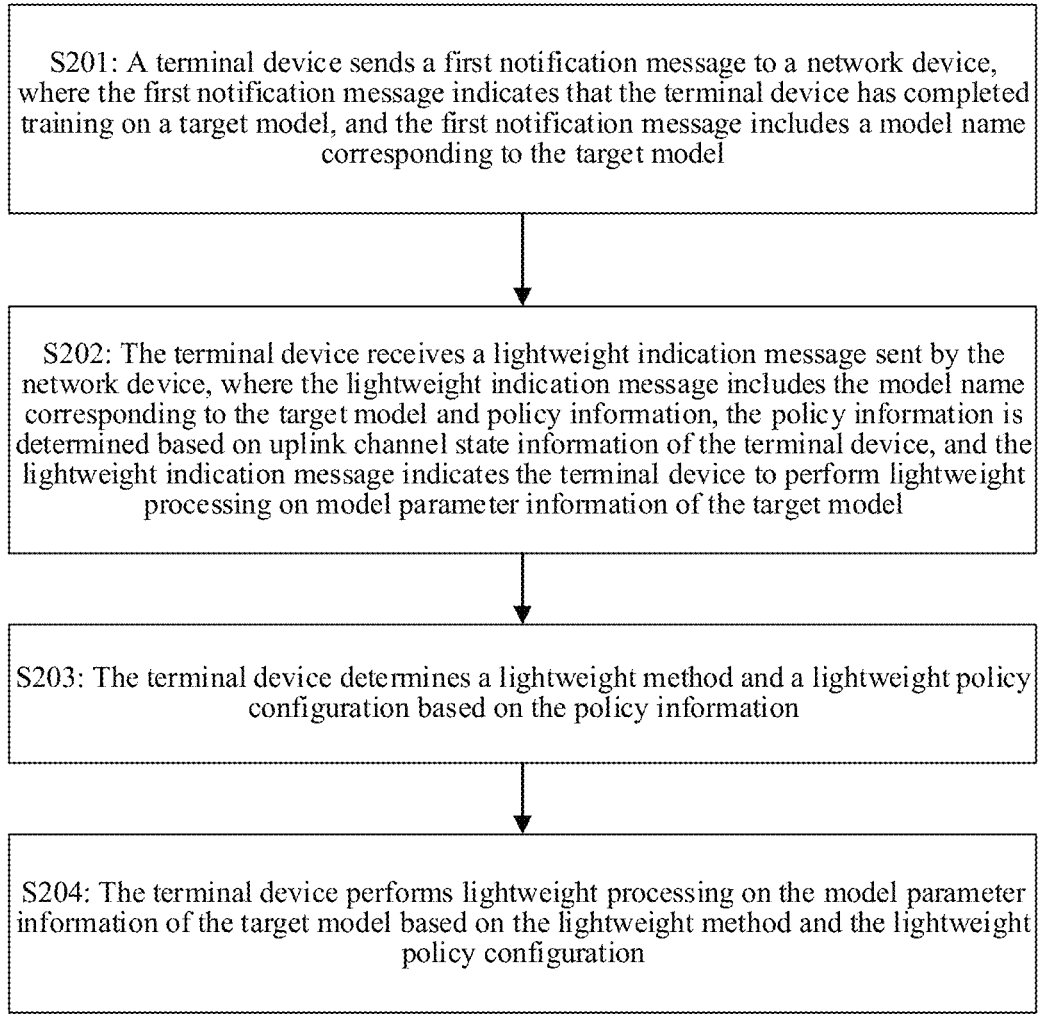
FIG. 6 is a schematic diagram of an embodiment of a lightweight processing method according to an embodiment of this application.

The following describes in detail, by using a terminal device as an execution body, a lightweight processing method used in embodiments of this application. FIG. 6 is a schematic diagram of an embodiment of a lightweight processing method according to an embodiment of this application. The information transmission method includes the following steps.

S201: A terminal device sends a first notification message to a network device, where the first notification message indicates that the terminal device has completed training on a target model, and the first notification message includes a model name corresponding to the target model.

In some embodiments, the network device selects, by using an internal algorithm, the terminal device that needs to participate in training the target model, and then sends a model training message to the terminal device that trains the target model. The model training message includes the model name of the target model and a model file of the target model. In this way, the terminal device may perform model training on the target model by using local data. After the terminal device has completed the training on the target model, the terminal device may send the first notification message to the network device, and the first notification message includes the model name corresponding to the target model, so that the network device determines, based on the first notification information, that the terminal device has completed the training on the target model.

Optionally, the first notification message may further include model parameter information of the target model. Specifically, the model parameter information is parameter file information, and the parameter file information is parameter file information corresponding to a parameter file type that has been agreed upon by the terminal device and the network device in advance. The parameter file type may be a gradient file, a residual file, or a weight file. In addition, the parameter file information may be a size of a parameter file, sparseness of a parameter file, or information that helps the network device determine a lightweight method and a lightweight policy configuration. This is not specifically limited herein.

Therefore, when the first notification message may further include the model parameter information, the terminal device may feed back, to the network device, information about a parameter file of another type other than the agreed type, to help the network device formulate lightweight indication information that is more suitable for the target model, and further ensure lightweight model precision. In addition, whether the model parameter information is included needs to be autonomously determined by the terminal device based on a feature of the model parameter information. For example, when the parameter file type agreed upon in advance is the weight file, if the terminal device determines that sparseness of the residual file is higher, a model precision loss after lightweight processing may be smaller. In this case, the terminal device may feed back information about the residual file to the network device by feeding back the model parameter information, to reduce the model precision loss after the lightweight processing.

Optionally, the model parameter information is in a form of a list, and each item in the list is <parameterType, parameterInfo>, where parameterType indicates the parameter file type, and parameterInfo indicates the parameter file information.

S202: The terminal device receives a lightweight indication message sent by the network device, where the lightweight indication message includes the model name corresponding to the target model and policy information, the policy information is determined based on uplink channel state information of the terminal device, and the lightweight indication message indicates to the terminal device to perform lightweight processing on model parameter information of the target model.

In some embodiments, the lightweight indication message indicates to the terminal device to perform lightweight processing on the model parameter information of the target model. Therefore, after receiving the lightweight indication message, the terminal device may start to perform a lightweight processing procedure. When the first notification message includes only the model name corresponding to the target model, in a manner similar to that described in step S102, the network device obtains the uplink channel state information of the terminal device through measurement, allocates an uplink transmission resource to the terminal device, and sends the lightweight indication message to the terminal device after determining the policy information based on the uplink channel state information, where the lightweight indication message includes the model name corresponding to the target model and the policy information. In addition, when the first notification message further includes the model parameter information, the network device may determine the policy information based on the uplink channel state information of the terminal device and the model parameter information of the target model. Because the policy information may be the size of the parameter file, the sparseness of the parameter file, or the information that helps the network device determine the lightweight method and the lightweight policy configuration, the policy information is further determined based on the parameter file information, so that accuracy of the determined policy information can be improved.

Optionally, the policy information may be any one of a file size condition policy, an uplink transmission rate condition policy, a transmission time condition policy, and a compression ratio condition policy, or the policy information is the lightweight method and the lightweight policy configuration. The lightweight method includes model pruning and/or model quantization. When the policy information is the lightweight method and the lightweight policy configuration, the lightweight method may be represented in a form of a bitmap or a plaintext. A specific representation manner of the lightweight method and the lightweight policy configuration are similar to those in the foregoing embodiment. Details are not described herein again.

Optionally, the policy information may further include a lightweight object, and the lightweight object indicates a target type of the model parameter information of the target model. In some embodiments, the lightweight object may be a gradient file, a residual file, or a weight file.

In addition, when the policy information comprises any one of the file size condition policy, the uplink transmission rate condition policy, the transmission time condition policy, and the compression ratio condition policy, the terminal device needs to determine a lightweight method and a lightweight policy configuration that support at least one of the conditional policies. Information included in the policy information is not limited herein. Specifically, in step S201, if the first notification message includes the model parameter information of the target model, and the model parameter information includes only the parameter file information corresponding to a default parameter file type, the policy information does not need to include the lightweight object. In other words, both the network device and the terminal device determine to perform lightweight processing on the default parameter file type. In step S201, if the first notification message includes the model parameter information of the target model, and the model parameter information includes a plurality of parameter file types and a plurality of types of parameter file information, the network device and the terminal device need to determine, by using the policy information, a parameter file type for performing lightweight processing. Therefore, the policy information further needs to include the lightweight object.

S203: The terminal device determines a lightweight method and a lightweight policy configuration.

In some embodiments, when the policy information is the lightweight method and the lightweight policy configuration that are determined by the network device, the terminal device may directly determine the lightweight method and the lightweight policy configuration based on the policy information. When the policy information comprises any one of the file size condition policy, the uplink transmission rate condition policy, the transmission time condition policy, and the compression ratio condition policy, the terminal device needs to determine, from at least one lightweight method and lightweight policy configuration (namely, lightweight capabilities) that the terminal device can support, the lightweight method and the lightweight policy configuration that support the at least one condition policy. If the lightweight capability of the terminal device cannot support the at least one condition policy, the lightweight method and the lightweight policy configuration are determined from lightweight methods and lightweight policy configurations that are supported by the terminal device. This is not limited herein.

Specifically, when the policy information comprises any one of the file size condition policy, the uplink transmission rate condition policy, the transmission time condition policy, and the compression ratio condition policy, the terminal device may determine the lightweight method and the lightweight policy configuration based on the model parameter feature. If a quantity of lightweight methods and lightweight policy configurations that can be selected and that can support the condition policy is greater than 1, a selected lightweight method and lightweight policy configuration is determined based on a policy of the terminal device. Specifically, a lightweight method and a lightweight policy configuration that have a minimum precision loss may be selected according to a principle of the minimum precision loss from a plurality of lightweight methods and lightweight policy configurations that support the condition policy, or a lightweight method and a lightweight policy configuration that first support the condition policy and that are found by the terminal device may be selected, or even one of all the lightweight methods and lightweight policy configurations that support the condition policy may be randomly selected. For example, when the model residual file is very sparse, the terminal device prefers to process the residual file by using a model pruning method. Therefore, in this case, a specific manner of determining the lightweight method and the lightweight policy configuration needs to be flexibly determined based on an actual situation. This is not limited herein.

S204: The terminal device performs lightweight processing on the model parameter information of the target model based on the lightweight method and the lightweight policy configuration.

In some embodiments, the terminal device performs lightweight processing on the model parameter information of the target model based on the lightweight method and the lightweight policy configuration that are determined in step S204.

It should be understood that, when the policy information comprises any one of the file size condition policy, the uplink transmission rate condition policy, the transmission time condition policy, and the compression ratio condition policy, if the lightweight method and the lightweight policy configuration are determined by the terminal device based on the policy information, in this case, because the lightweight method and the lightweight policy configuration are autonomously determined by the terminal device based on the policy information, if the determined lightweight method and lightweight policy configuration can match a lightweight capability of the terminal device, the terminal device may implement the determined lightweight method and lightweight policy configuration. In addition, there may also be a case in which the lightweight method and the lightweight policy configuration that are supported by the terminal device do not support the condition policy. In this case, lightweight processing fails, and the terminal device sends a second notification message to the network device. The second notification message includes the model name corresponding to the target model. The second notification message indicates that the lightweight method and the lightweight policy configuration that are supported by the terminal device cannot support any one of the file size condition policy, the uplink transmission rate condition policy, the transmission time condition policy, and the compression ratio condition policy, in other words, the terminal device fails to perform lightweight processing on the target model.

If the lightweight method and the lightweight policy configuration are determined by the terminal device, and the lightweight method and the lightweight policy configuration that are determined by the terminal device can match a lightweight capability of the terminal device, the terminal device may implement the determined lightweight method and lightweight policy configuration. In addition, in this case, there may also be a case in which the lightweight method and the lightweight policy configuration that are supported by the terminal device do not support the condition policy. In this case, the lightweight processing fails, and the terminal device sends a second notification message to the network device. The second notification message includes the model name corresponding to the target model. The second notification message indicates that the lightweight method and the lightweight policy configuration that are supported by the terminal device cannot support any one of the file size condition policy, the uplink transmission rate condition policy, the transmission time condition policy, and the compression ratio condition policy, in other words, the terminal device fails to perform lightweight processing on the target model.

Further, if the policy information is the lightweight method and the lightweight policy configuration, in other words, the lightweight method and the lightweight policy configuration are determined by the network device, the lightweight method and the lightweight policy configuration may not match a lightweight capability of the terminal device. Therefore, when the lightweight capability of the terminal device is not met, the terminal device sends a third notification message to the network device. The third notification message includes the model name corresponding to the target model. The third notification message indicates that the terminal device cannot perform the lightweight method and the lightweight policy configuration, in other words, the terminal device fails to perform lightweight processing on the target model. Whether the terminal device sends the second notification message or the third notification message needs to be determined depending on whether the terminal device successfully performs lightweight processing on the target model.

Optionally, if the policy information includes the lightweight object, the terminal device performs lightweight processing on the specified lightweight object; or if the policy information does not include the lightweight object, the terminal device performs lightweight processing on a default parameter file.

According to the foregoing embodiments, the information transmission method performed by the network device and the lightweight processing method performed by the terminal device are described. The following uses an example in which the network device enables, through information transmission, two terminal devices to perform lightweight processing on the target model for description.

It can be learned from the foregoing embodiments that the first notification message may include the model name corresponding to the target model, or the model name corresponding to the target model and the model parameter information of the target model. The policy information may be any one of the file size condition policy, the uplink transmission rate condition policy, the transmission time condition policy, and the compression ratio condition policy, or the policy information is the lightweight method and the lightweight policy configuration. The following describes a case in which the policy information is different information.

1. The policy information comprises any one of the file size condition policy, the uplink transmission rate condition policy, the transmission time condition policy, and the compression ratio condition policy.

Figure 7A:
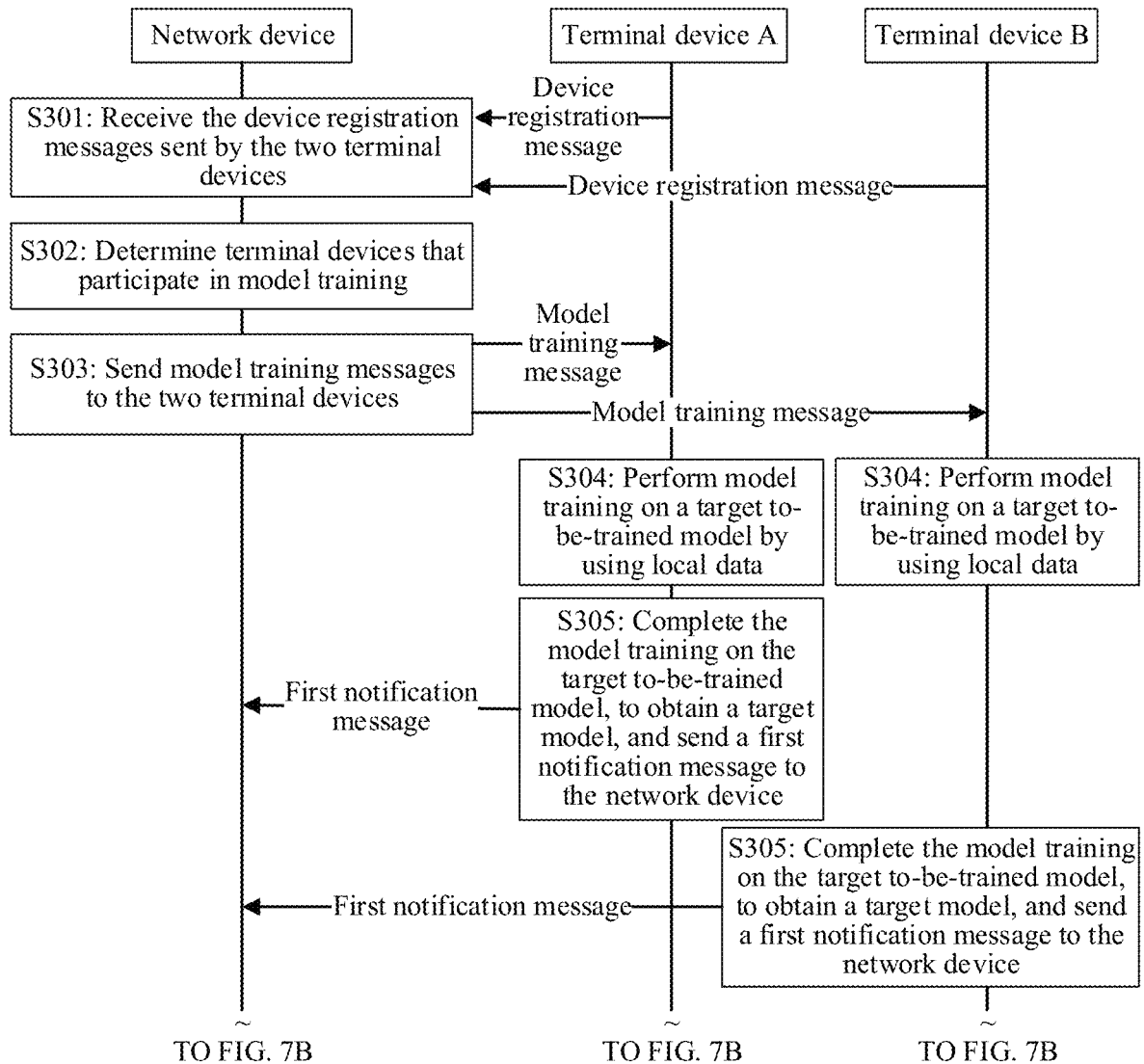
FIG. 7A and FIG. 7B are a schematic diagram of another embodiment of a lightweight processing method according to an embodiment of this application.
Figure 7B:
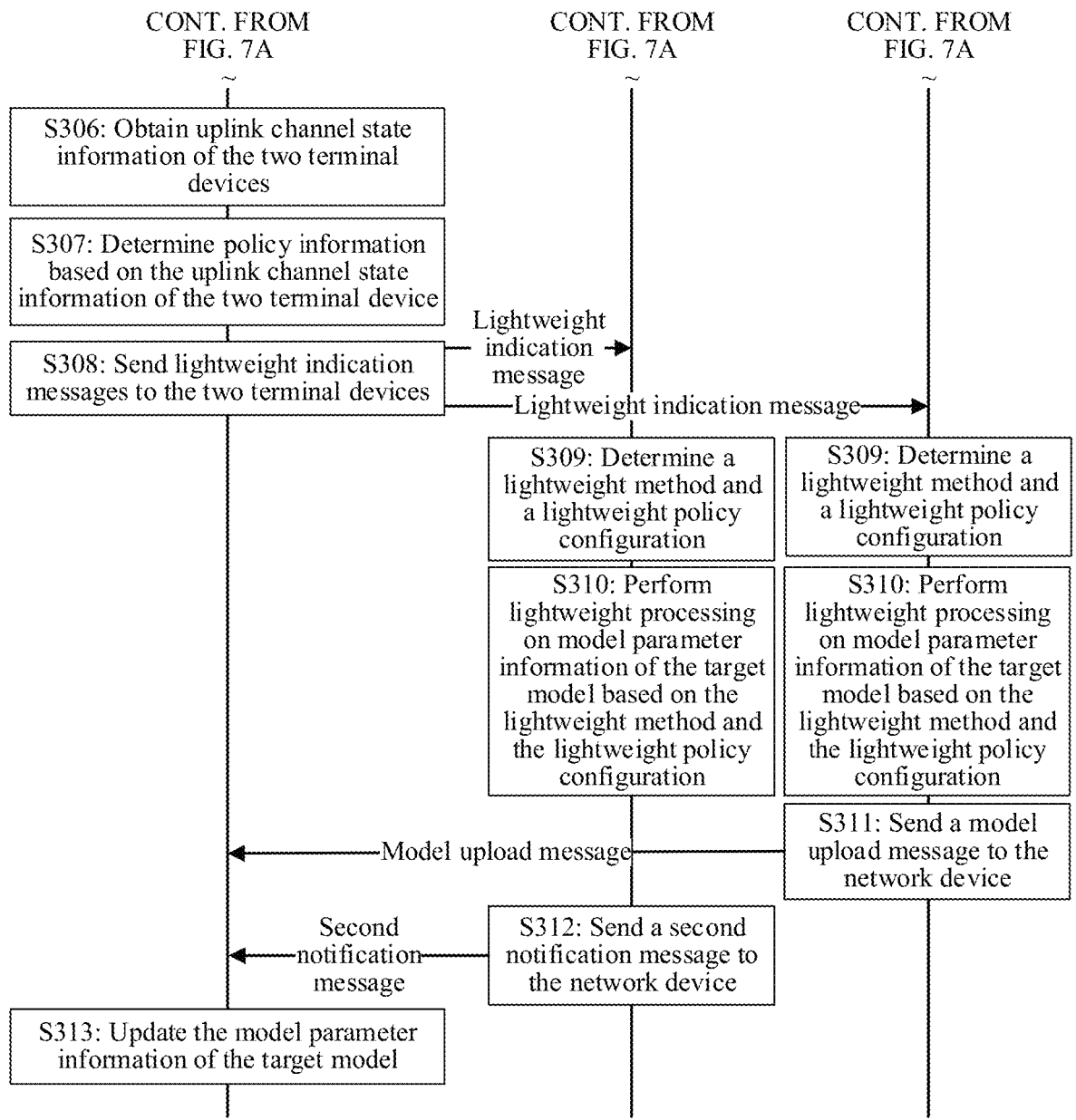

FIG. 7A and FIG. 7B are a schematic diagram of another embodiment of a lightweight processing method according to an embodiment of this application. The lightweight processing method includes the following steps.

S301: A network device receives device registration messages sent by two terminal devices.

In some embodiments, the two terminal devices (a terminal device A and a terminal device B) each send the device registration message to the network device, where the device registration message includes device information of the terminal device. When a training task of the network device is triggered, the network device may determine a target to-be-trained model, and perform step S302.

S302: The network device determines terminal devices that participate in model training.

In some embodiments, when the training task of the network device is triggered, the network device selects, by using an internal algorithm, the terminal devices that need to participate in the model training on the target to-be-trained model. In some embodiments, an example in which both the terminal device A and the terminal device B need to participate in the model training is used.

S303: The network device sends model training messages to the two terminal devices.

In some embodiments, the network device sends the model training messages to the terminal device A and the terminal device B, where the model training message includes a model name of a target model and a model file of the target model.

S304: The terminal device performs model training on a target to-be-trained model by using local data.

In some embodiments, after the terminal device A and the terminal device B receive the model training messages, the terminal device A performs model training on the target to-be-trained model by using the local data corresponding to the terminal device A, and the terminal device B performs model training on the target to-be-trained model by using the local data corresponding to the terminal device B.

S305: The terminal device completes the model training on the target to-be-trained model, to obtain a target model, and sends a first notification message to the network device.

In some embodiments, the terminal device A and the terminal device B each complete the model training on the target to-be-trained model, to obtain the target model, and send the first notification message to the network device. The specific first notification message is similar to that in the foregoing embodiment. Details are not described herein again.

S306: The network device obtains uplink channel state information of the two terminal devices.

In some embodiments, after receiving, based on step S305, the first notification messages sent by the two terminal devices, the network device triggers an uplink channel measurement procedure for the terminal device A and the terminal device B, to obtain the uplink channel state information of the terminal device A and the terminal device B. Further, the network device further allocates corresponding uplink transmission resources to the terminal device A and the terminal device B respectively based on the obtained uplink channel state information.

S307: The network device determines policy information based on the uplink channel state information of the two terminal devices.

In some embodiments, the first notification message may include the model name corresponding to the target model, or the model name corresponding to the target model and model parameter information of the target model. Therefore, when the first notification message includes the model name corresponding to the target model, the network device needs to determine the policy information based on the uplink channel state information obtained in step S306. However, when the first notification message includes the model name corresponding to the target model and the model parameter information of the target model, the network device needs to determine the policy information based on the uplink channel state information obtained in step S306 and the model parameter information of the target model. A specific manner of determining the policy information is similar to that in the foregoing embodiment. Details are not described herein again. In addition, in some embodiments, the policy information comprises any one of a file size condition policy, an uplink transmission rate condition policy, a transmission time condition policy, and a compression ratio condition policy.

S308: The network device sends lightweight indication messages to the two terminal devices.

In some embodiments, the network device sends the lightweight indication messages to the terminal device A and the terminal device B, where the lightweight indication message includes the model name corresponding to the target model and the policy information. A specific manner is similar to that in step S103. Details are not described herein again.

S309: The terminal device determines a lightweight method and a lightweight policy configuration.

In some embodiments, in step S308, the terminal device A and the terminal device B may receive the lightweight indication messages sent by the network device, and the lightweight indication message indicates to the terminal device to perform lightweight processing on the model parameter information of the target model. Therefore, the terminal device may determine the lightweight method and the lightweight policy configuration based on the policy information carried in the lightweight indication message. A specific manner is similar to that in step S203. Details are not described herein again.

S310: The terminal device performs lightweight processing on the model parameter information of the target model based on the lightweight method and the lightweight policy configuration.

In some embodiments, the policy information comprises any one of the file size condition policy, the uplink transmission rate condition policy, the transmission time condition policy, and the compression ratio condition policy. Therefore, the terminal device determines the lightweight method and the lightweight policy configuration based on the policy information. The lightweight method and the lightweight policy configuration match a lightweight capability of the terminal device, and also support any one of the foregoing conditional policies. The terminal device may implement the determined lightweight method and lightweight policy configuration. Therefore, the terminal device performs lightweight processing on the model parameter information of the target model based on the lightweight method and the lightweight policy configuration, and performs step S311. In addition, in a possible implementation, if the lightweight method and the lightweight policy configuration that are supported by the terminal device do not support the condition policy, the lightweight processing fails, and the terminal device performs step S312.

For example, an example in which the terminal device A fails to perform lightweight processing but the terminal device B completes lightweight processing is used in some embodiments. Therefore, the terminal device A performs step S312, and the terminal device B performs step S311.

S311: The terminal device sends a model upload message to the network device.

In some embodiments, after performing step S310, the terminal device B sends the model upload message to the network device. The model upload message includes the model name of the target model, a parameter file obtained by performing lightweight processing on the model parameter information of the target model, a training data length of the target model, the lightweight method, and the lightweight policy configuration.

Optionally, the model upload message may further include a lightweight object. When the lightweight object selected by the terminal device is not a default parameter file type agreed upon by the terminal device and the network device in advance, the lightweight object needs to be specified in the model upload message, so that the network device can obtain specific information of the lightweight processing.

S312: The terminal device sends a second notification message to the network device.

In some embodiments, in a possible implementation, because the terminal device A fails to perform lightweight processing, the terminal device A needs to send the second notification message to the network device. The second notification message includes the model name corresponding to the target model. The second notification message indicates that the lightweight method and the lightweight policy configuration that are supported by the terminal device A cannot support any one of the file size condition policy, the uplink transmission rate condition policy, the transmission time condition policy, and the compression ratio condition policy, in other words, the terminal device A fails to perform lightweight processing on the target model.

It should be understood that there is no time sequence limitation between step S311 and step S312. In other words, step S311 and step S312 may be performed simultaneously, or may be performed in a sequence. This should not be construed as a limitation on this embodiment.

S313: The network device updates the model parameter information of the target model.

In some embodiments, when the network device receives the model upload message sent by the terminal devices that perform model training on the target to-be-trained model, or receives the second notification message, or a maximum time limit is reached, the network device aggregates, by using an aggregation algorithm, the parameter file that is obtained by performing lightweight processing on the model parameter information of the target model and that is fed back by each terminal device that sends the model upload message, and updates the model parameter information of the target model.

For example, because the terminal device A fails to perform lightweight processing, the network device may learn, by using the second notification message sent by the terminal device A, that the lightweight method and the lightweight policy configuration that are supported by the terminal device A cannot support any one of the file size condition policy, the uplink transmission rate condition policy, the transmission time condition policy, and the compression ratio condition policy, in other words, the terminal device A fails to perform lightweight processing on the target model, but the terminal device B sends the model upload message. Therefore, the network device may aggregate the parameter file in the model upload message sent by the terminal device B, update the model parameter information of the target model.

Further, the network device needs to determine whether a condition for stopping training is met in this case. If the condition is not met, the network device performs step 302 to continue a procedure from training to aggregation. If the condition is met, this procedure ends.

2. The policy information is the lightweight method and the lightweight policy configuration.

Figure 8A:
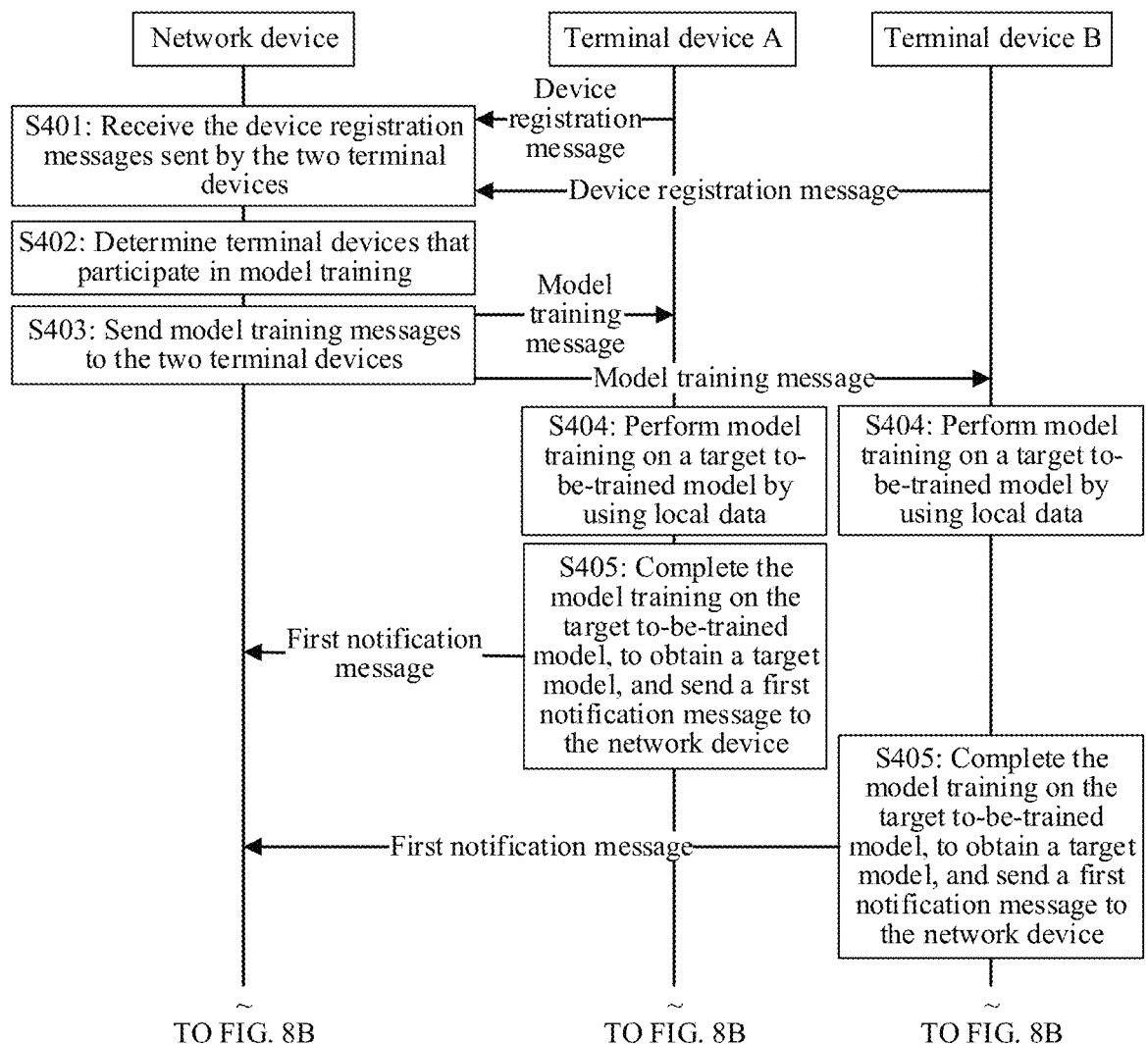
FIG. 8A and FIG. 8B are a schematic diagram of another embodiment of a lightweight processing method according to an embodiment of this application.
Figure 8B:
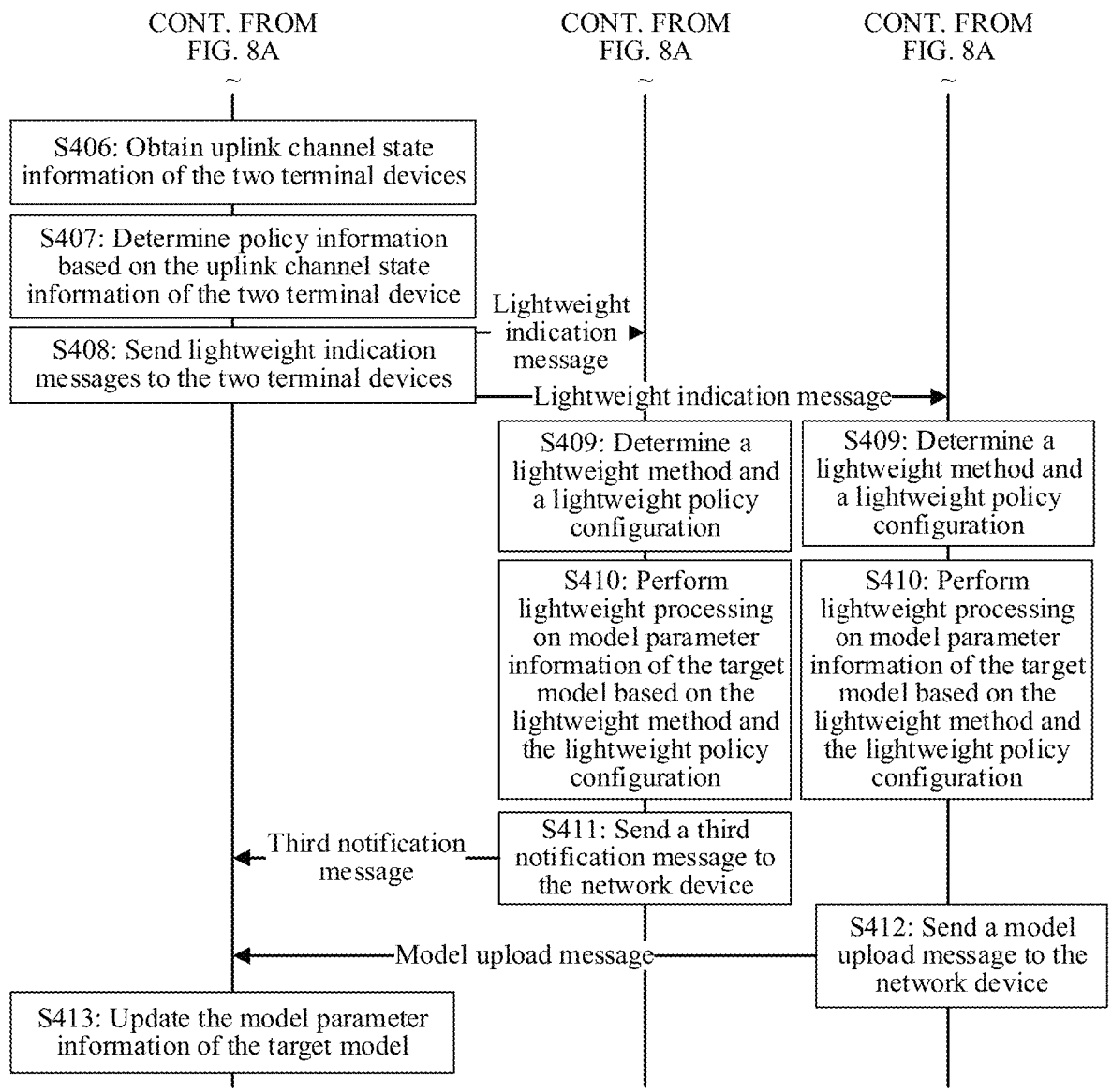

FIG. 8A and FIG. 8B are a schematic diagram of another embodiment of a lightweight processing method according to an embodiment of this application. The lightweight processing method includes the following steps.

S401: A network device receives device registration messages sent by two terminal devices.

In some embodiments, a manner in which the network device receives the device registration messages sent by the two terminal devices is similar to that in step S301. Details are not described herein again.

S402: The network device determines terminal devices that participate in model training.

In some embodiments, a manner in which the network device determines the terminal devices that participate in the model training is similar to that in step S302. Details are not described herein again.

S403: The network device sends model training messages to the two terminal devices.

In some embodiments, a manner in which the network device sends the model training messages to the two terminal devices is similar to that in step S303. Details are not described herein again.

S404: The terminal device performs model training on a target to-be-trained model by using local data.

In some embodiments, a manner in which the terminal device performs model training on the target to-be-trained model by using the local data is similar to that in step S304. Details are not described herein again.

S405: The terminal device completes the model training on the target to-be-trained model, to obtain a target model, and sends a first notification message to the network device.

In some embodiments, a manner in which terminal device completes the model training on the target to-be-trained model, to obtain the target model, and sends the first notification message to the network device is similar to that in step S305. Details are not described again.

S406: The network device obtains uplink channel state information of the two terminal devices.

In some embodiments, a manner in which the network device obtains the uplink channel state information of the two terminal devices is similar to that in step S306. Details are not described herein again.

S407: The network device determines policy information based on the uplink channel state information of the two terminal devices.

In some embodiments, a manner in which the network device determines the policy information based on the uplink channel state information of the two terminal devices is similar to that in step S307. Details are not described herein again. However, in some embodiments, the policy information is the lightweight method and the lightweight policy configuration.

S408: The network device sends lightweight indication messages to the two terminal devices.

In some embodiments, a manner in which the network device sends the lightweight indication messages to the two terminal devices is similar to that in step S308. Details are not described herein again.

S409: The terminal device determines a lightweight method and a lightweight policy configuration.

In some embodiments, in step S408, the terminal device A and the terminal device B may receive the lightweight indication messages sent by the network device, and the policy information in the lightweight indication message is the lightweight method and the lightweight policy configuration. Therefore, the terminal device may directly obtain the lightweight method and the lightweight policy configuration. A specific manner is similar to that in step S203. Details are not described herein again.

S410: The terminal device performs lightweight processing on the model parameter information of the target model based on the lightweight method and the lightweight policy configuration.

In some embodiments, the policy information is the lightweight method and the lightweight policy configuration. Because the lightweight method and the lightweight policy configuration are determined by the network device, the lightweight method and the lightweight policy configuration may not match a lightweight capability of the terminal device. Therefore, when the lightweight capability of the terminal device is not met, the terminal device cannot perform lightweight processing on the model parameter information of the target model, and consequently needs to perform step S411. If the lightweight capability is met, the terminal device performs lightweight processing on the model parameter information of the target model based on the lightweight method and the lightweight policy configuration, and performs step S412.

For example, an example in which the terminal device A fails to perform lightweight processing but the terminal device B completes lightweight processing is used in some embodiments. Therefore, the terminal device A performs step S411, and the terminal device B performs step S412.

S411: The terminal device sends a third notification message to the network device.

In some embodiments, the terminal device A sends the third notification message to the network device, where the third notification message includes the model name corresponding to the target model, and the third notification message indicates that the terminal device cannot perform the lightweight method and the lightweight policy configuration, in other words, the terminal device A fails to perform lightweight processing on the target model.

S412: The terminal device sends a model upload message to the network device.

In some embodiments, a manner in which the terminal device sends the model upload message to the network device is similar to that in step S311. Details are not described herein again.

It should be understood that there is no time sequence limitation between step S411 and step S412. In other words, step S411 and step S412 may be performed simultaneously, or may be performed in a sequence. This should not be construed as a limitation on this embodiment.

S413: The network device updates the model parameter information of the target model.

In some embodiments, when the network device receives the model upload message sent by the terminal devices that perform model training on the target to-be-trained model, or receives the third notification message, or a maximum time limit is reached, the network device aggregates, by using an aggregation algorithm, the parameter file that is obtained by performing lightweight processing on the model parameter information of the target model and that is fed back by each terminal device that sends the model upload message, and updates the model parameter information of the target model.

For example, because the terminal device A fails to perform lightweight processing, the network device may learn, by using the third notification message sent by the terminal device A, that the terminal device A cannot perform the lightweight method and the lightweight policy configuration, in other words, the terminal device A fails to perform lightweight processing on the target model, but the terminal device B sends the model upload message. Therefore, the network device may aggregate the parameter file in the model upload message sent by the terminal device B, update the model parameter information of the target model.

Further, the network device needs to determine whether a condition for stopping training is met in this case. If the condition is not met, the network device performs step 402 to continue a procedure from training to aggregation. If the condition is met, this procedure ends.

It can be learned from the foregoing embodiments that, when the policy information is the lightweight method and the lightweight policy configuration that are determined by the network device, the lightweight capability of the terminal device cannot perform the lightweight method and the lightweight policy configuration. Therefore, when the network device determines the policy information, if the lightweight capability of the terminal device has been obtained, where the lightweight capability refers to the lightweight method and the lightweight policy configuration that the terminal device can accommodate, the lightweight method and the lightweight policy configuration that are determined by the network device match the lightweight capability of the terminal device, so that a possibility that the terminal device fails to perform lightweight processing is avoided. The following separately describes a manner in which the network device obtains the lightweight capability of the terminal device by using different messages.

1. The device registration message carries lightweight capability information of the terminal device, and the lightweight capability information indicates at least one piece of policy information supported by the terminal device.

Figure 9A:
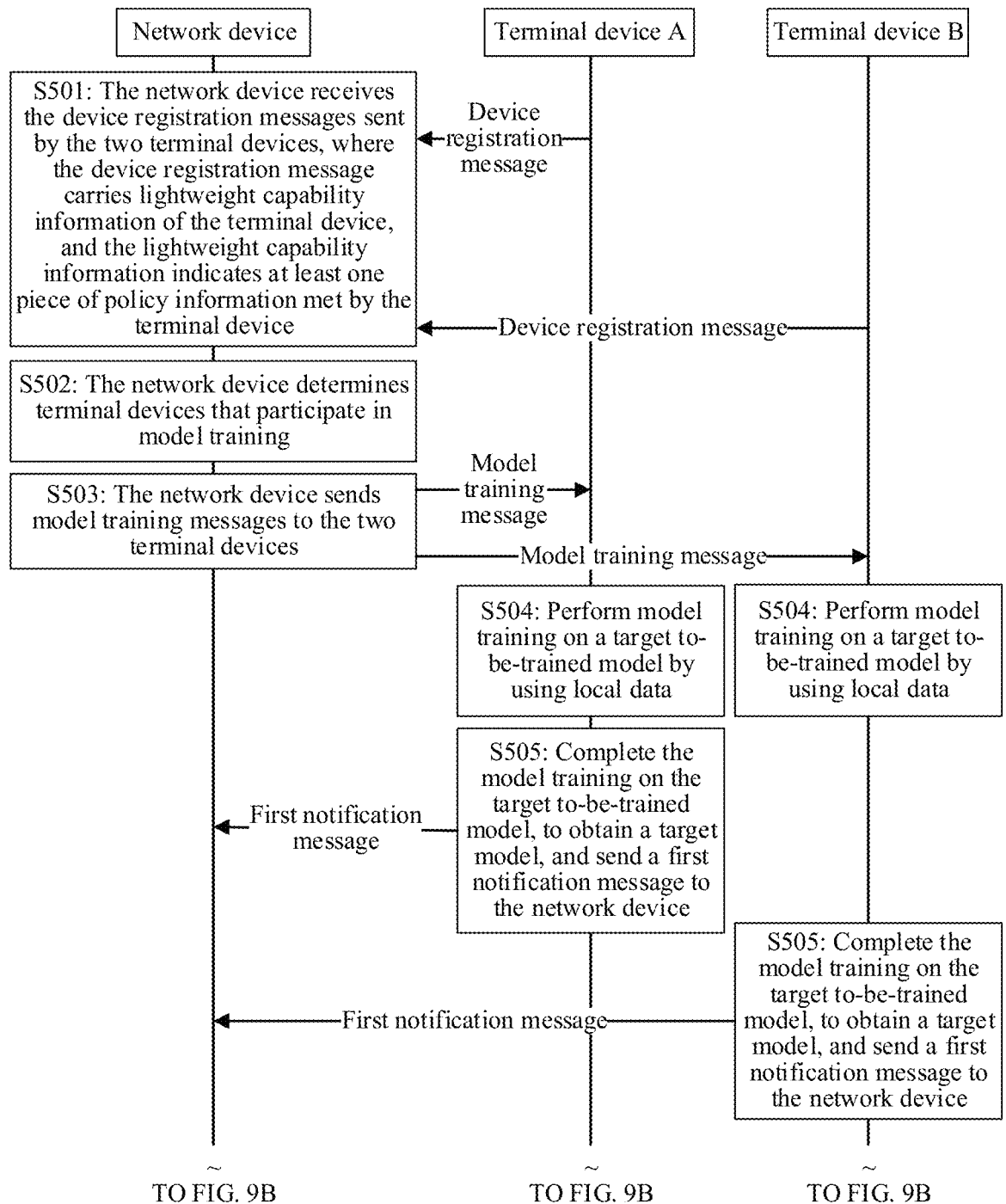
FIG. 9A and FIG. 9B are a schematic diagram of another embodiment of a lightweight processing method according to an embodiment of this application.
Figure 9B:
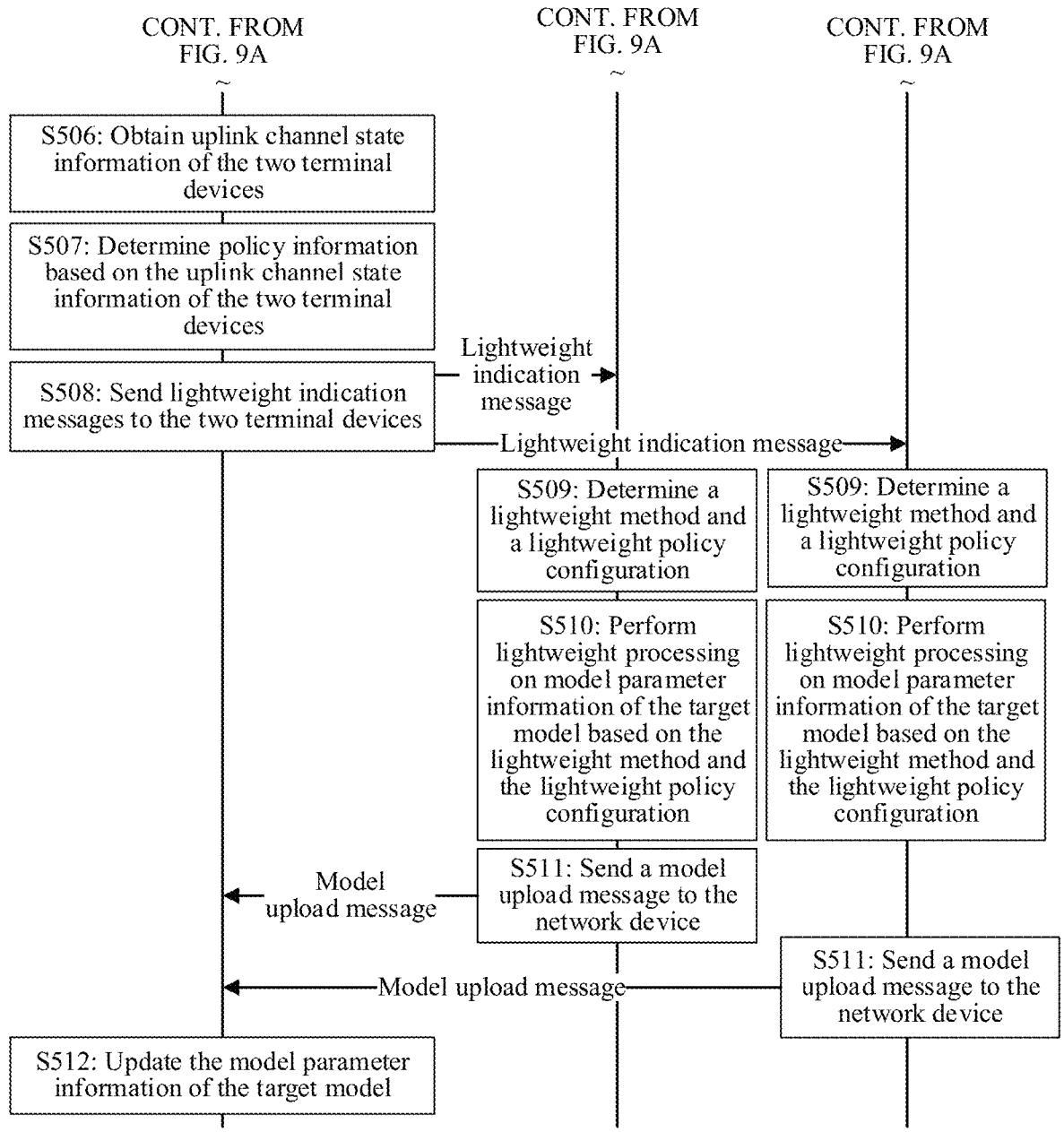

FIG. 9A and FIG. 9B are a schematic diagram of another embodiment of a lightweight processing method according to an embodiment of this application. The lightweight processing method includes the following steps.

S501: A network device receives device registration messages sent by two terminal devices, where the device registration message carries lightweight capability information of the terminal device, and the lightweight capability information indicates at least one piece of policy information supported by the terminal device.

In some embodiments, the two terminal devices (a terminal device A and a terminal device B) each send the device registration message to the network device, where the device registration message includes device information of the terminal device, the device registration message carries the lightweight capability information of the terminal device, and the lightweight capability information indicates the at least one piece of policy information supported by the terminal device. Then, when a training task of the network device is triggered, the network device may determine a target to-be-trained model, and perform step S502.

Specifically, the lightweight capability refers to a lightweight method that is defined in a standard and that is supported by the terminal device. The lightweight capability may be transmitted in a form of a plaintext, or may be transmitted in a form of a bitmap. A specific transmission form is similar to that of a lightweight object. Details are not described herein again.

S502: The network device determines terminal devices that participate in model training.

In some embodiments, a manner in which the network device determines the terminal devices that participate in the model training is similar to that in step S302. Details are not described herein again.

S503: The network device sends model training messages to the two terminal devices.

In some embodiments, a manner in which the network device sends the model training messages to the two terminal devices is similar to that in step S303. Details are not described herein again.

S504: The terminal device performs model training on a target to-be-trained model by using local data.

In some embodiments, a manner in which the terminal device performs model training on the target to-be-trained model by using the local data is similar to that in step S304. Details are not described herein again.

S505: The terminal device completes the model training on the target to-be-trained model, to obtain a target model, and sends a first notification message to the network device.

In some embodiments, a manner in which terminal device completes the model training on the target to-be-trained model, to obtain the target model, and sends the first notification message to the network device is similar to that in step S305. Details are not described again.

S506: The network device obtains uplink channel state information of the two terminal devices.

In some embodiments, a manner in which the network device obtains the uplink channel state information of the two terminal devices is similar to that in step S306. Details are not described herein again.

S507: The network device determines policy information based on the uplink channel state information of the two terminal devices.

In some embodiments, the first notification message may include the model name corresponding to the target model, or the model name corresponding to the target model and model parameter information of the target model. Therefore, when the first notification message includes the model name corresponding to the target model, the network device needs to determine the policy information based on the uplink channel state information obtained in step S506, and the determined policy information needs to match the lightweight capability information of the terminal device obtained in step S501. When the first notification message includes the model name corresponding to the target model and the model parameter information of the target model, the network device needs to determine the policy information based on the uplink channel state information obtained in step S506 and the model parameter information of the target model, and the determined policy information needs to match the lightweight capability information of the terminal device obtained in step S501.

It should be understood that a specific manner of determining the policy information is similar to that in the foregoing embodiment, provided that the determined policy information matches the lightweight capability information of the terminal device. Details are not described herein again. In addition, in some embodiments, the policy information is the lightweight method and the lightweight policy configuration.

S508: The network device sends lightweight indication messages to the two terminal devices.

In some embodiments, a manner in which the network device sends the lightweight indication messages to the two terminal devices is similar to that in step S308. Details are not described herein again.

S509: The terminal device determines a lightweight method and a lightweight policy configuration.

In some embodiments, a manner in which the terminal device determines the lightweight method and the lightweight policy configuration is similar to that in step S203. Details are not described herein again.

S510: The terminal device performs lightweight processing on the model parameter information of the target model based on the lightweight method and the lightweight policy configuration.

In some embodiments, in step 507, because the policy information (the lightweight method and the lightweight policy configuration) determined by the network device matches the lightweight capability information of the terminal device, a case in which the terminal device fails to perform lightweight processing is avoided. Therefore, a specific manner in which the terminal device performs lightweight processing on the model parameter information of the target model based on the lightweight method and the lightweight policy configuration is similar to that in step S204. Details are not described herein again. Further, in some embodiments, if the terminal device cannot perform the lightweight method and the lightweight policy configuration, or when the lightweight method and the lightweight policy configuration that are supported by the terminal device cannot support any one of a file size condition policy, an uplink transmission rate condition policy, a transmission time condition policy, and a compression ratio condition policy, lightweight processing fails. For details, refer to the corresponding descriptions in FIG. 7A and FIG. 7B and FIG. 8A and FIG. 8B. Details are not described herein again.

S511: The terminal device sends a model upload message to the network device.

In some embodiments, a manner in which the terminal device sends the model upload message to the network device is similar to that in step S311. Details are not described herein again.

S512: The network device updates the model parameter information of the target model.

In some embodiments, a manner in which the network device updates the model parameter information of the target model is similar to that in step S312. Details are not described herein again.

2. The network device receives a capability query acknowledgment message sent by the terminal device, where the capability query acknowledgment message carries the lightweight capability information of the terminal device, and the lightweight capability information indicates at least one piece of policy information supported by the terminal device.

Figure 10A:
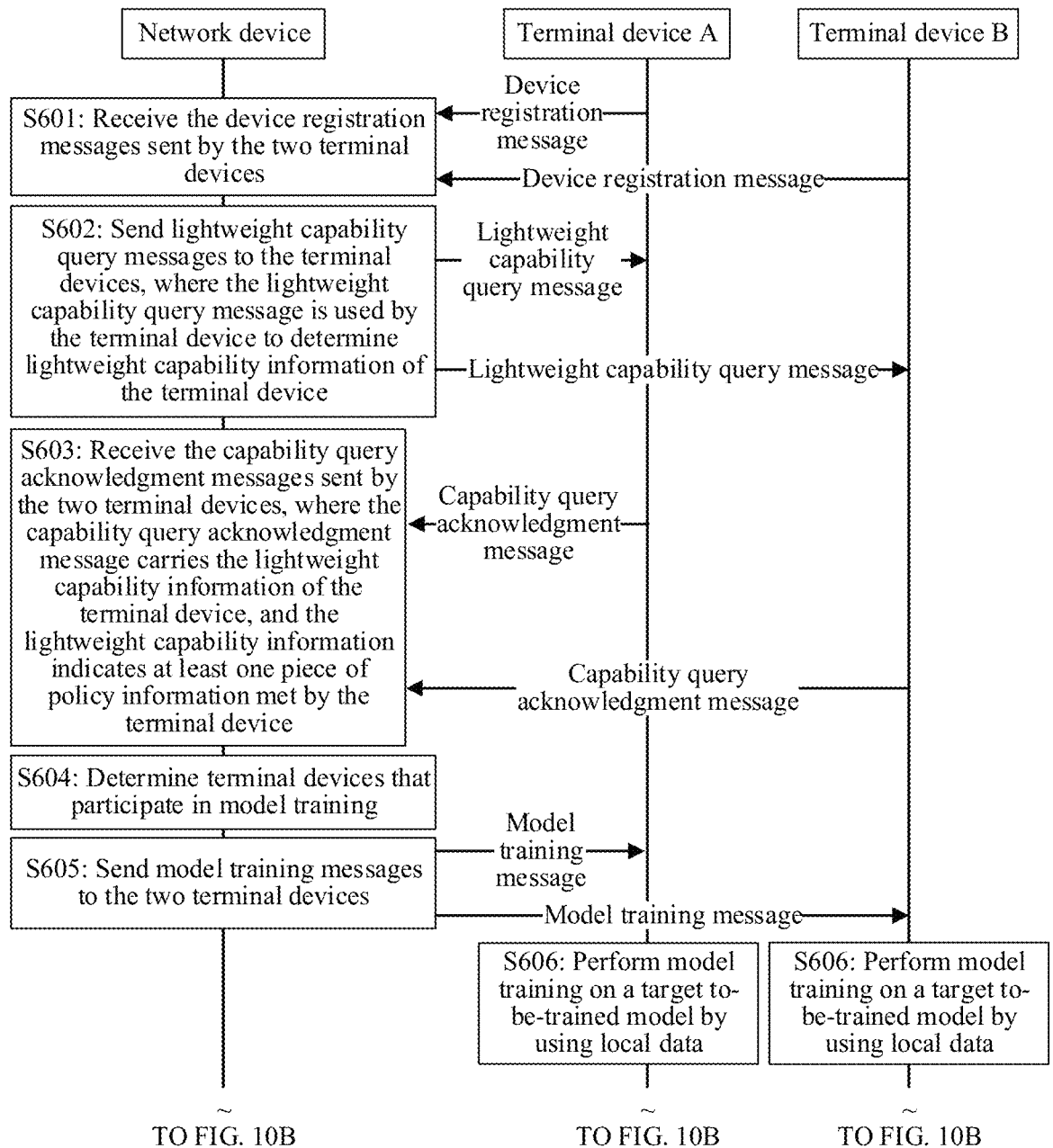
FIG. 10A and FIG. 10B are a schematic diagram of another embodiment of a lightweight processing method according to an embodiment of this application.
Figure 10B:
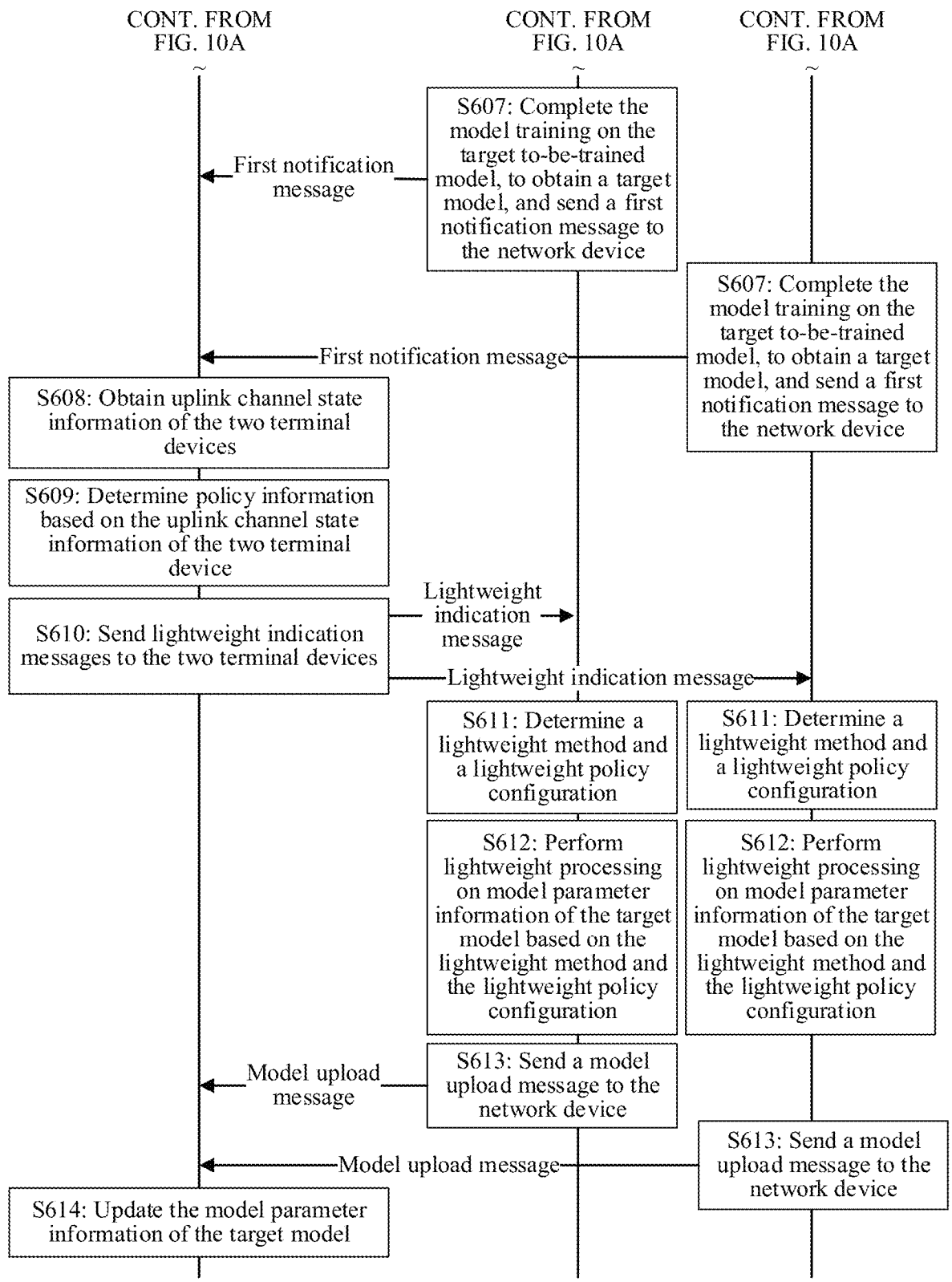

FIG. 10A and FIG. 10B are a schematic diagram of another embodiment of a lightweight processing method according to an embodiment of this application. The lightweight processing method includes the following steps.

S601: A network device receives device registration messages sent by two terminal devices.

In some embodiments, a manner in which the network device receives the device registration messages sent by the two terminal devices is similar to that in step S301. Details are not described herein again.

S602: The network device sends lightweight capability query messages to the terminal devices, where the lightweight capability query message is used by the terminal device to determine lightweight capability information of the terminal device.

In some embodiments, the network device sends the lightweight capability query messages to the terminal devices, so that the terminal device determines the lightweight capability information of the terminal device by using the lightweight capability query message.

Specifically, the lightweight capability refers to a lightweight method that is defined in a standard and that is supported by the terminal device. The lightweight capability may be transmitted in a form of a plaintext, or may be transmitted in a form of a bitmap. A specific transmission form is similar to that of a lightweight object. Details are not described herein again.

S603: The network device receives capability query acknowledgment messages sent by the terminal devices, where the capability query acknowledgment message carries the lightweight capability information of the terminal device, and the lightweight capability information indicates at least one piece of policy information supported by the terminal device.

In some embodiments, after determining the lightweight capability information of the terminal device, the terminal device sends the capability query acknowledgment message to the network device, where the capability query acknowledgment message carries the lightweight capability information of the terminal device, and the lightweight capability information indicates the at least one piece of policy information supported by the terminal device. Therefore, the network device obtains the lightweight capability information of the terminal device. Then, when a training task of the network device is triggered, the network device may determine a target to-be-trained model.

S604: The network device determines terminal devices that participate in model training.

In some embodiments, a manner in which the network device determines the terminal devices that participate in the model training is similar to that in step S302. Details are not described herein again.

S605: The network device sends model training messages to the two terminal devices.

In some embodiments, a manner in which the network device sends the model training messages to the two terminal devices is similar to that in step S303. Details are not described herein again.

S606: The terminal device performs model training on a target to-be-trained model by using local data.

In some embodiments, a manner in which the terminal device performs model training on the target to-be-trained model by using the local data is similar to that in step S304. Details are not described herein again.

S607: The terminal device completes the model training on the target to-be-trained model, to obtain a target model, and sends a first notification message to the network device.

In some embodiments, a manner in which terminal device completes the model training on the target to-be-trained model, to obtain the target model, and sends the first notification message to the network device is similar to that in step S305. Details are not described again.

S608: The network device obtains uplink channel state information of the two terminal devices.

In some embodiments, a manner in which the network device obtains the uplink channel state information of the two terminal devices is similar to that in step S306. Details are not described herein again.

S609: The network device determines policy information based on the uplink channel state information of the two terminal devices.

In some embodiments, a manner in which the network device determines the policy information based on the uplink channel state information of the two terminal devices is similar to that in step S507. Details are not described herein again.

S610: The network device sends lightweight indication messages to the two terminal devices.

In some embodiments, a manner in which the network device sends the lightweight indication messages to the two terminal devices is similar to that in step S308. Details are not described herein again.

S611: The terminal device determines a lightweight method and a lightweight policy configuration.

In some embodiments, a manner in which the terminal device determines the lightweight method and the lightweight policy configuration is similar to that in step S203. Details are not described herein again.

S612: The terminal device performs lightweight processing on the model parameter information of the target model based on the lightweight method and the lightweight policy configuration.

In some embodiments, a manner in which the terminal device performs lightweight processing on the model parameter information of the target model based on the lightweight method and the lightweight policy configuration is similar to that in step S510. Details are not described herein again.

S613: The terminal device sends a model upload message to the network device.

In some embodiments, a manner in which the terminal device sends the model upload message to the network device is similar to that in step S311. Details are not described herein again.

S614: The network device updates the model parameter information of the target model.

In some embodiments, a manner in which the network device updates the model parameter information of the target model is similar to that in step S312. Details are not described herein again.

The foregoing describes the solutions provided in embodiments of this application from a perspective of the methods. It may be understood that, to implement the foregoing functions, the communication apparatus includes a corresponding hardware structure and/or software module for performing the functions. A person of ordinary skill in the art should easily be aware that, with reference to modules, algorithms and steps in the examples described in embodiments disclosed in this specification, this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that in embodiments of this application, module division is an example, and is merely a logical function division. During actual implementation, another division manner may be used.

Figure 11:
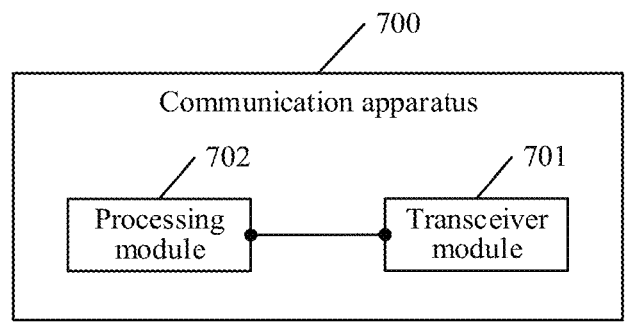
FIG. 11 is a schematic diagram of an embodiment of a communication apparatus according to an embodiment of this application.

The following describes a communication apparatus in this application in detail. FIG. 11 is a schematic diagram of an embodiment of the communication apparatus according to an embodiment of this application. As shown in the figure, the communication apparatus 700 includes a transceiver module 701 and a processing module 702.

Optionally, the communication apparatus 700 may correspond to the network device in the foregoing method embodiments, for example, may be the network device, or may be a component (for example, a circuit, a chip, or a chip system) disposed in the network device.

It should be understood that the communication apparatus 700 may correspond to the method in FIG. 5, the method in FIG. 7A and FIG. 7B, the method in FIG. 8A and FIG. 8B, the method in FIG. 9A and FIG. 9B, or the method in FIG. 10A and FIG. 10B according to embodiments of this application. The communication apparatus 700 may include units configured to perform the methods performed by the network device in the method in FIG. 5, the method in FIG. 7A and FIG. 7B, the method in FIG. 8A and FIG. 8B, the method in FIG. 9A and FIG. 9B, or the method in FIG. 10A and FIG. 10B. In addition, the units in the communication apparatus 700 and the foregoing other operations and/or functions are used to implement corresponding procedures in the method in FIG. 5, the method in FIG. 7A and FIG. 7B, the method in FIG. 8A and FIG. 8B, the method in FIG. 9A and FIG. 9B, or the method in FIG. 10A and FIG. 10B.

When the communication apparatus 700 is configured to perform the method in FIG. 5, the transceiver module 701 may be configured to perform step S101 and step S103 in the method in FIG. 5, and the processing module 702 may be configured to perform step S102 in the method in FIG. 5. It should be understood that an example process in which the units perform the foregoing corresponding steps is described in detail in the foregoing method embodiments. For brevity, details are not described herein again.

When the communication apparatus 700 is configured to perform the method in FIG. 7A and FIG. 7B, the transceiver module 701 may be configured to perform step S301, step S305, and step S311 or step S312 in the method in FIG. 7A and FIG. 7B, and the processing module 702 may be configured to perform step S304, step S305, step S309, and step S310 in the method in FIG. 7A and FIG. 7B. It should be understood that a specific process in which the units perform the foregoing corresponding steps is described in detail in the foregoing method embodiments. For brevity, details are not described herein again.

When the communication apparatus 700 is configured to perform the method in FIG. 8A and FIG. 8B, the transceiver module 701 may be configured to perform step S401, step S405, step S411, and step S412 in the method in FIG. 7A and FIG. 7B, and the processing module 702 may be configured to perform step S404, step S405, step S409, and step S410 in the method in FIG. 7A and FIG. 7B. It should be understood that an example process in which the units perform the foregoing corresponding steps is described in detail in the foregoing method embodiments. For brevity, details are not described herein again.

When the communication apparatus 700 is configured to perform the method in FIG. 9A and FIG. 9B, the transceiver module 701 may be configured to perform step S501, step S505, and step S511 in the method in FIG. 7A and FIG. 7B, and the processing module 702 may be configured to perform step S504, step S505, step S509, and step S510 in the method in FIG. 7A and FIG. 7B. It should be understood that an example process in which the units perform the foregoing corresponding steps is described in detail in the foregoing method embodiments. For brevity, details are not described herein again.

When the communication apparatus 700 is configured to perform the method in FIG. 10A and FIG. 10B, the transceiver module 701 may be configured to perform step S601, step S602, step S603, step S605, step S607, and step S613 in the method in FIG. 7A and FIG. 7B, and the processing module 702 may be configured to perform step S606, step S607, step S611, and step S612 in the method in FIG. 7A and FIG. 7B. It should be understood that an example process in which the units perform the foregoing corresponding steps is described in detail in the foregoing method embodiments. For brevity, details are not described herein again.

Figure 13:
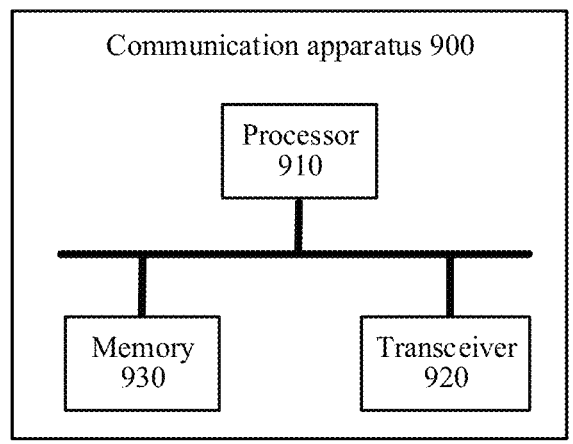
FIG. 13 is a schematic block diagram of a communication apparatus according to an embodiment of this application.
Figure 15:
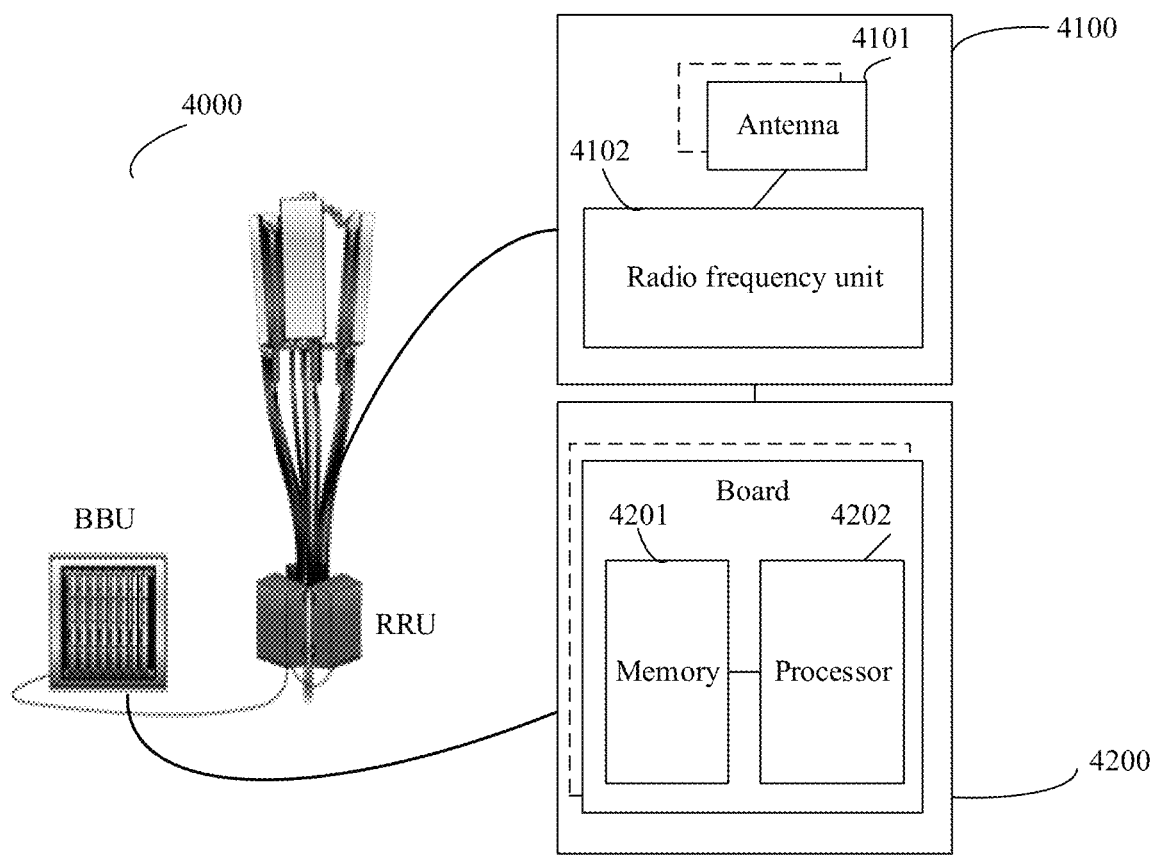
FIG. 15 is a schematic diagram of a structure of a network device according to an embodiment of this application.

It should be further understood that, when the communication apparatus 700 is the network device, the transceiver module 701 in the communication apparatus 700 may be implemented by using a transceiver, for example, may correspond to a transceiver 920 in a communication apparatus 900 shown in FIG. 13 or a remote radio unit (remote radio unit, RRU) 4100 in a network device 4000 shown in FIG. 15; and the processing module 702 in the communication apparatus 700 may be implemented by using at least one processor, for example, may correspond to a processor 910 in the communication apparatus 900 shown in FIG. 13, or a processing unit 4200 or a processor 4202 in the network device 4000 shown in FIG. 15.

It should be further understood that when the communication apparatus 700 is the chip or the chip system disposed in the network device, the transceiver module 701 in the communication apparatus 700 may be implemented by an input/output interface, a circuit, or the like, and the processing module 702 in the communication apparatus 700 may be implemented by a processor, a microprocessor, an integrated circuit, or the like integrated into the chip or the chip system.

Figure 12:
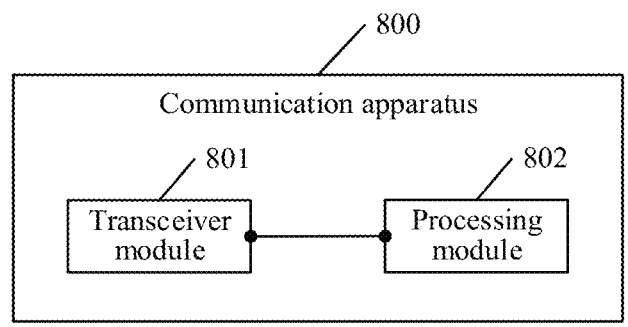
FIG. 12 is a schematic diagram of another embodiment of a communication apparatus according to an embodiment of this application.

FIG. 12 is a schematic diagram of another embodiment of a communication apparatus according to an embodiment of this application. As shown in the figure, the communication apparatus 800 includes a transceiver module 801 and a processing module 802.

Optionally, the communication apparatus 800 may correspond to the terminal device in the foregoing method embodiments, for example, may be the terminal device, or may be a component (for example, a circuit, a chip, or a chip system) disposed in the terminal device.

It should be understood that the communication apparatus 800 may correspond to the method in FIG. 6, the method in FIG. 7A and FIG. 7B, the method in FIG. 8A and FIG. 8B, the method in FIG. 9A and FIG. 9B, or the method in FIG. 10A and FIG. 10B according to embodiments of this application. The communication apparatus 800 may include units configured to perform the method in FIG. 6, the method in FIG. 7A and FIG. 7B, the method in FIG. 8A and FIG. 8B, the method in FIG. 9A and FIG. 9B, or the method performed by the terminal device in the method in FIG. 10A and FIG. 10B. In addition, the units in the communication apparatus 800 and the foregoing other operations and/or functions are used to implement corresponding procedures in the method in FIG. 6, the method in FIG. 7A and FIG. 7B, the method in FIG. 8A and FIG. 8B, the method in FIG. 9A and FIG. 9B, or the method in FIG. 10A and FIG. 10B.

When the communication apparatus 800 is configured to perform the method in FIG. 6, the transceiver module 801 may be configured to perform step S201 and step S202 in the method in FIG. 6, and the processing module 802 may be configured to perform step S203 and step S204 in the method in FIG. 4. It should be understood that a specific process in which the units perform the foregoing corresponding steps is described in detail in the foregoing method embodiments. For brevity, details are not described herein again.

When the communication apparatus 800 is configured to perform the method in FIG. 7A and FIG. 7B, the transceiver module 801 may be configured to perform step S301, step S303, step S305, step S306, step S308, and step S311 or step 312 in the method in FIG. 7A and FIG. 7B, and the processing module 802 may be configured to perform step S302, step S307, and step S313 in the method in FIG. 7A and FIG. 7B. It should be understood that an example process in which the units perform the foregoing corresponding steps is described in detail in the foregoing method embodiments. For brevity, details are not described herein again.

When the communication apparatus 800 is configured to perform the method in FIG. 8A and FIG. 8B, the transceiver module 801 may be configured to perform step S401, step S403, step S405, step S406, step S408, step S411, and step S412 in the method in FIG. 8A and FIG. 8B, and the processing module 802 may be configured to perform step S402, step S407, and step S413 in the method in FIG. 8A and FIG. 8B. It should be understood that an example process in which the units perform the foregoing corresponding steps is described in detail in the foregoing method embodiments. For brevity, details are not described herein again.

When the communication apparatus 800 is configured to perform the method in FIG. 9A and FIG. 9B, the transceiver module 801 may be configured to perform step S501, step S503, step S505, step S506, step S508, and step S511 in the method in FIG. 9A and FIG. 9B, and the processing module 802 may be configured to perform step S502, step S507, and step S512 in the method in FIG. 7A and FIG. 7B. It should be understood that a specific process in which the units perform the foregoing corresponding steps is described in detail in the foregoing method embodiments. For brevity, details are not described herein again.

When the communication apparatus 800 is configured to perform the method in FIG. 10A and FIG. 10B, the transceiver module 801 may be configured to perform step S601, step S602, step S603, step S605, step S607, step S608, step S610, and step S613 in the method in FIG. 10A and FIG. 10B, and the processing module 802 may be configured to perform step S604, step S609, and step S614 in the method in FIG. 7A and FIG. 7B. It should be understood that a specific process in which the units perform the foregoing corresponding steps is described in detail in the foregoing method embodiments. For brevity, details are not described herein again.

Figure 14:
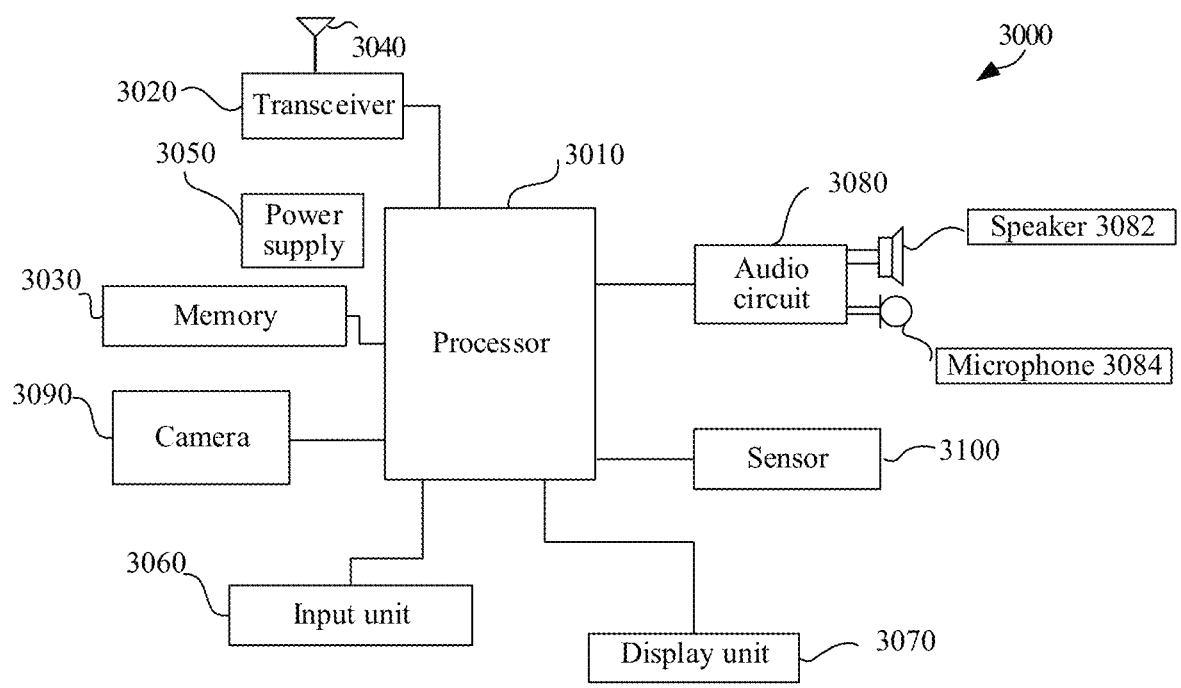
FIG. 14 is a schematic diagram of a structure of a terminal device according to an embodiment of this application.

It should be further understood that when the communication apparatus 800 is the terminal device, the transceiver module 801 in the communication apparatus 800 may be implemented by using a transceiver, for example, may correspond to a transceiver 920 in a communication apparatus 900 shown in FIG. 13 or a transceiver 3020 in a terminal device 3000 shown in FIG. 14, and the processing module 802 in the communication apparatus 800 may be implemented by using at least one processor, for example, may correspond to a processor 910 in the communication apparatus 900 shown in FIG. 13 or a processor 3010 in the terminal device 3000 shown in FIG. 14.

It should be further understood that when the communication apparatus 800 is the chip or the chip system disposed in the terminal device, the transceiver module 801 in the communication apparatus 800 may be implemented by an input/output interface, a circuit, or the like, and the processing module 802 in the communication apparatus 800 may be implemented by a processor, a microprocessor, an integrated circuit, or the like integrated into the chip or the chip system.

FIG. 13 is a schematic block diagram of a communication apparatus 900 according to an embodiment of this application. As shown in FIG. 13, the communication apparatus 900 includes a processor 910, a transceiver 920, and a memory 930. The processor 910, the transceiver 920, and the memory 930 communicate with each other by using an internal connection path. The memory 930 is configured to store instructions. The processor 910 is configured to execute the instructions stored in the memory 930, to control the transceiver 920 to send a signal and/or receive a signal.

It should be understood that the communication apparatus 900 may correspond to the terminal device in the foregoing method embodiments, and may be configured to perform steps and/or procedures performed by the network device or the terminal device in the foregoing method embodiments. Optionally, the memory 930 may include a read-only memory and a random access memory, and provide instructions and data for the processor. A part of the memory may further include a nonvolatile random access memory. The memory 930 may be an independent component, or may be integrated into the processor 910. The processor 910 may be configured to execute the instructions stored in the memory 930. In addition, when the processor 910 executes the instructions stored in the memory, the processor 910 is configured to perform steps and/or procedures corresponding to the network device or the terminal device in the foregoing method embodiments.

Optionally, the communication apparatus 900 is the terminal device in the foregoing embodiments.

Optionally, the communication apparatus 900 is the network device in the foregoing embodiments.

The transceiver 920 may include a transmitter and a receiver. The transceiver 920 may further include an antenna. There may be one or more antennas. The processor 910, the memory 930, and the transceiver 920 may be components integrated into different chips. For example, the processor 910 and the memory 930 may be integrated into a baseband chip, and the transceiver 920 may be integrated into a radio frequency chip. Alternatively, the processor 910, the memory 930, and the transceiver 920 may be components integrated into a same chip. This is not limited in this application.

Optionally, the communication apparatus 900 is a component disposed in the terminal device, for example, a circuit, a chip, or a chip system.

Optionally, the communication apparatus 900 is a component disposed in the network device, for example, a circuit, a chip, or a chip system.

Alternatively, the transceiver 920 may be a communication interface, for example, an input/output interface or a circuit. The transceiver 920, the processor 910, and the memory 920 may be integrated into a same chip, for example, integrated into a baseband chip.

FIG. 14 is a schematic diagram of a structure of a terminal device 3000 according to an embodiment of this application. The terminal device 3000 may be used in the system shown in FIG. 1, and performs functions of the terminal device in the foregoing method embodiments. As shown in the figure, the terminal device 3000 includes a processor 3010 and a transceiver 3020. Optionally, the terminal device 3000 further includes a memory 3030. The processor 3010, the transceiver 3020, and the memory 3030 may communicate with each other through an internal connection path, to transfer a control signal and/or a data signal. The memory 3030 is configured to store a computer program. The processor 3010 is configured to invoke the computer program from the memory 3030 and run the computer program, to control the transceiver 3020 to send and receive a signal. Optionally, the terminal device 3000 may further include an antenna 3040, configured to send, by using a radio signal, uplink data or uplink control signaling output by the transceiver 3020.

The processor 3010 and the memory 3030 may be integrated into one communication apparatus. The processor 3010 is configured to execute program code stored in the memory 3030, to implement the foregoing functions. During specific implementation, the memory 3030 may alternatively be integrated into the processor 3010, or may be independent of the processor 3010. The processor 3010 may correspond to the processing module 802 in FIG. 12 or the processor 910 in FIG. 13.

The transceiver 3020 may correspond to the transceiver module 801 in FIG. 12 or the transceiver 920 in FIG. 13. The transceiver 3020 may include a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

It should be understood that, the terminal device 3000 shown in FIG. 14 can implement procedures related to the terminal device in the method embodiments shown in FIG. 6, FIG. 7A and FIG. 7B, FIG. 8A and FIG. 8B, FIG. 9A and FIG. 9B, and FIG. 10A and FIG. 10B. Operations and/or functions of modules in the terminal device 3000 are respectively intended to implement corresponding procedures in the foregoing method embodiments. For details, refer to the descriptions in the foregoing method embodiments. To avoid repetition, detailed descriptions are properly omitted herein.

The processor 3010 may be configured to perform an action that is implemented inside the terminal device and that is described in the foregoing method embodiments. The transceiver 3020 may be configured to perform an action of receiving and sending that is performed by the terminal device from or to the network device and that is described in the foregoing method embodiments. For details, refer to the descriptions in the foregoing method embodiments. Details are not described herein again.

Optionally, the terminal device 3000 may further include a power supply 3050, configured to supply power to various devices or circuits in the terminal device.

In addition, to improve functions of the terminal device, the terminal device 3000 may further include one or more of an input unit 3060 such as a port, device, or circuit, a display unit 3070, an audio circuit 3080, a camera 3090, a sensor 3100, and the like. The audio circuit may further include a speaker 3082, a microphone 3084, and the like.

FIG. 15 is a schematic diagram of a structure of a network device according to an embodiment of this application, for example, may be a schematic diagram of a structure of a base station. The base station 4000 may be used in the system shown in FIG. 1, and performs functions of the network device in the foregoing method embodiments. As shown in the figure, the base station 4000 may include one or more radio frequency units, such as an RRU 4100 and one or more baseband units (BBUs) (which may also be referred to as a distributed unit (DU)) 4200. The RRU 4100 may be referred to as a transceiver unit, and may correspond to the transceiver module 701 in FIG. 11 or the transceiver 2020 in FIG. 13. Optionally, the RRU 4100 may also be referred to as a transceiver machine, a transceiver circuit, a transceiver, or the like, and may include at least one antenna 4101 and a radio frequency unit 4102. Optionally, the RRU 4100 may include a receiving unit and a sending unit. The receiving unit may correspond to a receiver (which is also referred to as a receiver machine or a receiver circuit), and the sending unit may correspond to a transmitter (which is also referred to as a transmitter machine or a transmitter circuit). The RRU 4100 is configured to: receive and send a radio frequency signal, and perform conversion between the radio frequency signal and a baseband signal. For example, the RRU 4100 is configured to send indication information to a terminal device. The BBU 4200 is configured to: perform baseband processing, control the base station, and so on. The RRU 4100 and the BBU 4200 may be physically disposed together, or may be physically disposed separately, namely, a distributed base station.

The BBU 4200 is a control center of the base station, may also be referred to as a processing unit, may correspond to the processing module 702 in FIG. 11 or the processor 910 in FIG. 13, and is configured to complete baseband processing functions such as channel coding, multiplexing, modulation, and spectrum spreading. For example, the BBU (the processing unit) may be configured to control the base station to perform an operation procedure related to the network device in the foregoing method embodiments, for example, to generate the foregoing indication information.

In an example, the BBU 4200 may include one or more boards, and a plurality of boards may jointly support a radio access network (such as an LTE network) having a single access standard, or may separately support radio access networks (such as an LTE network, a 5G network, or another network) having different access standards. The BBU 4200 further includes a memory 4201 and a processor 4202. The memory 4201 is configured to store necessary instructions and data. The processor 4202 is configured to control the base station to perform a necessary action, for example, control the base station to perform the operation procedure related to the network device in the foregoing method embodiments. The memory 4201 and the processor 4202 may serve one or more boards. In other words, a memory and a processor may be separately disposed on each board. Alternatively, a plurality of boards may share a same memory and processor. In addition, a necessary circuit may further be disposed on each board.

It should be understood that the base station 4000 shown in FIG. 15 can implement procedures related to the network device in the method embodiments shown in FIG. 5, FIG. 7A and FIG. 7B, FIG. 8A and FIG. 8B, FIG. 9A and FIG. 9B, and FIG. 10A and FIG. 10B. Operations and/or functions of modules in the base station 4000 are respectively intended to implement corresponding procedures in the foregoing method embodiments. For details, refer to the descriptions in the foregoing method embodiments. To avoid repetition, detailed descriptions are properly omitted herein.

The BBU 4200 may be configured to perform an action that is implemented inside the network device as described in the foregoing method embodiments. The RRU 4100 may be configured to perform an action of receiving or sending that is performed by the network device from or to the terminal device as described in the foregoing method embodiments. For details, refer to the descriptions in the foregoing method embodiments. Details are not described herein again.

It should be understood that the base station 4000 shown in FIG. 15 is merely a possible form of the network device, but should not constitute any limitation on this application. The method provided in this application is applicable to a network device in another form. For example, the network device includes an AAU, and may further include a CU and/or a DU; includes a BBU and an adaptive radio unit (ARU); or includes a BBU. Alternatively, the network device may be a customer premises equipment (CPE), or may be in another form. A specific form of the network device is not limited in this application.

The CU and/or the DU may be configured to perform an action that is implemented inside the network device and that is described in the foregoing method embodiments. The AAU may be configured to perform an action of receiving or sending that is performed by the network device from or to the terminal device and that is described in the foregoing method embodiments. For details, refer to the descriptions in the foregoing method embodiments. Details are not described herein again.

This application further provides a communication apparatus, including at least one processor. The at least one processor is configured to execute a computer program stored in a memory, to enable the communication apparatus to perform the method performed by the terminal device or the network device in any one of the foregoing method embodiments.

It should be understood that the communication apparatus may be one or more chips. For example, the communication apparatus may be a field programmable gate array (FPGA), an application-specific integrated circuit (ASIC), a system on chip (SoC), a central processing unit (CPU), a network processor (NP), a digital signal processor (DSP), a microcontroller unit (MCU), a programmable logic device (PLD), or another integrated chip.

An embodiment of this application further provides a communication apparatus, including a processor and a communication interface. The communication interface is coupled to the processor. The communication interface is configured to input and/or output information. The information includes at least one of instructions and data. The processor is configured to execute a computer program, to enable the communication apparatus to perform the method performed by the terminal device or the network device in any one of the foregoing method embodiments.

An embodiment of this application further provides a communication apparatus, including a processor and a memory. The memory is configured to store a computer program, and the processor is configured to invoke the computer program from the memory and run the computer program, to enable the communication apparatus to perform the method performed by the terminal device or the network device in any one of the foregoing method embodiments.

During implementation, steps of the foregoing methods can be completed by using a hardware integrated logic circuit in the processor or instructions in a form of software. The steps in the methods disclosed with reference to embodiments of this application may be directly performed and completed by using a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again.

It should be noted that, the processor in embodiments of this application may be an integrated circuit chip, and has a signal processing capability. During implementation, steps in the foregoing method embodiments can be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor, or the like. The steps in the methods disclosed with reference to embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor.

It may be understood that the memory in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example, and not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these memories and any memory of another proper type.

According to the methods provided in embodiments of this application, this application further provides a computer program product. The computer program product includes computer program code. When the computer program code is run on a computer, the computer is enabled to perform the method performed by the terminal device or the method performed by the network device in the embodiments shown in FIG. 5 to FIG. 10A and FIG. 10B.

According to the methods provided in embodiments of this application, this application further provides a computer-readable storage medium. The computer-readable storage medium stores program code. When the program code is run on a computer, the computer is enabled to perform the method performed by the terminal device or the method performed by the network device in the embodiments shown in FIG. 5 to FIG. 10A and FIG. 10B.

According to the methods provided in embodiments of this application, this application further provides a system. The system includes the foregoing one or more terminal devices and one or more network devices.

The network device and the terminal device in the foregoing apparatus embodiments completely correspond to the network device and the terminal device in the method embodiments. A corresponding module or unit performs a corresponding step. For example, a communication unit (a transceiver) performs a receiving or sending step in the method embodiments, and a step other than the sending or receiving step may be performed by a processing unit (a processor). For a function of a specific unit, refer to a corresponding method embodiment. There may be one or more processors.

In the foregoing embodiments, the terminal device may be used as an example of a receiving device, and the network device may be used as an example of a sending device. However, this shall not constitute any limitation on this application. For example, both the sending device and the receiving device may be terminal devices. Specific types of the sending device and the receiving device are not limited in this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on a signal having one or more data packets (for example, data from two components interacting with another component in a local system, a distributed system, and/or across a network such as the internet interacting with another system by using the signal).

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, comprising:
  receiving, by a network device, a first notification message sent by a terminal device, wherein the first notification message indicates that the terminal device has completed training on a target model, and the first notification message comprises a model name corresponding to the target model;
  determining, by the network device, policy information based on uplink channel state information of the terminal device, wherein the policy information is used by the terminal device to determine a lightweight method and a lightweight policy configuration; and
  sending, by the network device, a lightweight indication message to the terminal device, wherein the lightweight indication message comprises the model name corresponding to the target model and the policy information, and the lightweight indication message indicates to the terminal device to perform lightweight processing on model parameter information of the target model.

2. The method according to claim 1, wherein the policy information comprises one of a file size condition policy, an uplink transmission rate condition policy, a transmission time condition policy, or a compression ratio condition policy; and
  the method further comprises:
  receiving, by the network device, a second notification message sent by the terminal device, wherein the second notification message comprises the model name corresponding to the target model, and the second notification message indicates that the terminal device cannot support the one of the file size condition policy, the uplink transmission rate condition policy, the transmission time condition policy, or the compression ratio condition policy.

3. The method according to claim 1, wherein the policy information is the lightweight method and the lightweight policy configuration; and
  the method further comprises:
  receiving, by the network device, a third notification message sent by the terminal device, wherein the third notification message comprises the model name corresponding to the target model, and the third notification message indicates that the terminal device cannot perform the lightweight method and the lightweight policy configuration.

4. The method according to claim 1, wherein the policy information comprises any one of a file size condition policy, an uplink transmission rate condition policy, a transmission time condition policy, or a compression ratio condition policy; and the method further comprises:
receiving, by the network device, a model upload message sent by the terminal device, wherein the model upload message carries the lightweight method and the lightweight policy configuration.

5. The method according to claim 1, wherein the first notification message comprises the model parameter information of the target model; and the determining, by the network device, policy information based on uplink channel state information of the terminal device comprises:
determining, by the network device, the policy information based on the model parameter information of the target model and the uplink channel state information of the terminal device.

6. The method according to claim 5, wherein the policy information is the lightweight method and the lightweight policy configuration; or the policy information comprises any one of a file size condition policy, an uplink transmission rate condition policy, a transmission time condition policy, or a compression ratio condition policy.

7. The method according to claim 6, wherein the policy information comprises a lightweight object, and the lightweight object indicates a target type of the model parameter information of the target model.

8. The method according to claim 1, wherein the method further comprises:
receiving, by the network device, a device registration message sent by the terminal device, wherein the device registration message carries lightweight capability information of the terminal device, and the lightweight capability information indicates at least one piece of policy information supported by the terminal device.

9. The method according to claim 1, wherein the method further comprises:
sending, by the network device, a lightweight capability query message to the terminal device, wherein the lightweight capability query message is used by the terminal device to determine lightweight capability information of the terminal device; and
receiving, by the network device, a capability query acknowledgment message sent by the terminal device, wherein the capability query acknowledgment message carries the lightweight capability information of the terminal device, and the lightweight capability information indicates at least one piece of policy information supported by the terminal device.

10. The method according to claim 9, wherein the lightweight capability query message comprises the model name corresponding to the target model.

11. The method according to claim 1, wherein the lightweight indication message further comprises the lightweight object, and the lightweight object indicates the target type of the model parameter information of the target model.

12. A lightweight processing method, comprising:
sending, by a terminal device, a first notification message to a network device, wherein the first notification message indicates that the terminal device has completed training on a target model, and the first notification message comprises a model name corresponding to the target model;
receiving, by the terminal device, a lightweight indication message sent by the network device, wherein the lightweight indication message comprises the model name corresponding to the target model and policy information, the policy information is determined based on uplink channel state information of the terminal device, and the lightweight indication message indicates to the terminal device to perform lightweight processing on model parameter information of the target model;
determining, by the terminal device, a lightweight method and a lightweight policy configuration based on the policy information; and
performing, by the terminal device, lightweight processing on the model parameter information of the target model based on the lightweight method and the lightweight policy configuration.

13. The method according to claim 12, wherein the policy information comprises one of a file size condition policy, an uplink transmission rate condition policy, a transmission time condition policy, or a compression ratio condition policy; and the method further comprises:
sending, by the terminal device, a second notification message to the network device, wherein the second notification message comprises the model name corresponding to the target model, and the second notification message indicates that the terminal device cannot support the one of the file size condition policy, the uplink transmission rate condition policy, the transmission time condition policy, or the compression ratio condition policy.

14. The method according to claim 12, wherein the policy information is the lightweight method and the lightweight policy configuration; and the method further comprises:
sending, by the terminal device, a third notification message to the network device, wherein the third notification message comprises the model name corresponding to the target model, and the third notification message indicates that the terminal device cannot perform the lightweight method and the lightweight policy configuration.

15. The method according to claim 12, wherein the policy information comprises any one of a file size condition policy, an uplink transmission rate condition policy, a transmission time condition policy, or a compression ratio condition policy; and the method further comprises:
sending, by the terminal device, a model upload message to the network device, wherein the model upload message carries the lightweight method and the lightweight policy configuration.

16. The method according to claim 12, wherein the first notification message comprises the model parameter information of the target model.

17. The method according to claim 16, wherein the policy information is the lightweight method and the lightweight policy configuration; or the policy information comprises any one of a file size condition policy, an uplink transmission rate condition policy, a transmission time condition policy, or a compression ratio condition policy.

18. The method according to claim 12, wherein the method further comprises:
    sending, by the terminal device, a device registration message to the network device, wherein the device registration message carries lightweight capability information of the terminal device, and the lightweight capability information indicates at least one piece of policy information supported by the terminal device.

19. A network device, comprising:
    a processor, a memory, and an input/output interface, wherein
    the processor is coupled to the memory and the input/output interface; and
    the processor performs the following steps by running code in the memory:
    receiving a first notification message sent by a terminal device, wherein the first notification message indicates that the terminal device has completed training on a target model, and the first notification message comprises a model name corresponding to the target model;
    determining policy information based on uplink channel state information of the terminal device; and
    sending a lightweight indication message to the terminal device, wherein the lightweight indication message comprises the model name corresponding to the target model and the policy information, and wherein the policy information is used by the terminal device to determine a lightweight method and a lightweight policy configuration and the lightweight indication message indicates to the terminal device to perform lightweight processing on model parameter information of the target model.

20. A terminal device, comprising:
    a processor, a memory, and an input/output interface, wherein
    the processor is coupled to the memory and the input/output interface; and
    the processor performs the following steps by running code in the memory:
    sending a first notification message to a network device, wherein the first notification message indicates that the terminal device has completed training on a target model, and the first notification message comprises a model name corresponding to the target model;
    receiving a lightweight indication message sent by the network device, wherein the lightweight indication message comprises the model name corresponding to the target model and policy information, the policy information is determined based on uplink channel state information of the terminal device, and the lightweight indication message indicates to the terminal device to perform lightweight processing on model parameter information of the target model;
    determining a lightweight method and a lightweight policy configuration based on the policy information; and
    performing lightweight processing on the model parameter information of the target model based on the lightweight method and the lightweight policy configuration.

* * * * *